(12) United States Patent
Park

(10) Patent No.: US 9,086,787 B2
(45) Date of Patent: Jul. 21, 2015

(54) MOBILE TERMINAL AND CONTROL METHOD THEREOF

(71) Applicant: LG ELECTRONICS INC., Seoul (KR)

(72) Inventor: Hyesuk Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/906,415

(22) Filed: May 31, 2013

(65) Prior Publication Data
US 2014/0062919 A1  Mar. 6, 2014

(30) Foreign Application Priority Data
Aug. 29, 2012 (KR) .................. 10-2012-0095187

(51) Int. Cl.
*G06F 3/0488* (2013.01)
*G06F 3/0484* (2013.01)
*G06F 1/16* (2006.01)

(52) U.S. Cl.
CPC ............ *G06F 3/0484* (2013.01); *G06F 1/1626* (2013.01); *G06F 1/1643* (2013.01); *G06F 3/0488* (2013.01); *G06F 2203/04104* (2013.01)

(58) Field of Classification Search
CPC ...................................................... G06F 3/0488
USPC ........................................................... 345/173
See application file for complete search history.

(56) References Cited

U.S. PATENT DOCUMENTS

| 2010/0235778 | A1* | 9/2010 | Kocienda et al. | 715/781 |
| 2010/0277439 | A1* | 11/2010 | Charlier et al. | 345/176 |
| 2011/0074716 | A1* | 3/2011 | Ono | 345/173 |
| 2011/0252349 | A1* | 10/2011 | Chaudhri | 715/769 |

* cited by examiner

*Primary Examiner* — Kevin Nguyen
(74) *Attorney, Agent, or Firm* — KED & Associates LLP

(57) ABSTRACT

TA mobile terminal is provided that is capable of controlling content displayed on a display device thereof. The mobile terminal may include a transparent display including a first surface and a second surface that overlap each other and that display content and sense a touch input, a memory that stores at least one application including a plurality of control functions for controlling the content, and a controller that may implement the application in response to a first touch input received at the first surface, and that may perform at least one of the plurality of control functions based on a second touch input received at the second surface when the application is carried out.

10 Claims, 33 Drawing Sheets

MOBILE TERMINAL AND CONTROL METHOD THEREOF

CROSS-REFERENCE TO RELATED APPLICATION(S)

This application claims priority under 35 U.S.C. §119 to Korean Application No. 10-2012-0095187 filed on Aug. 29, 2012, whose entire disclosure is hereby incorporated by reference.

BACKGROUND

1. Field

This relates to a mobile terminal and a control method thereof.

2. Background

Terminals may include mobile or portable terminals and stationary terminals, based on mobility. Mobile terminals may be further classified into handheld terminals, vehicle mounted terminals, and the like based on whether or not the terminal may be carried by a user. Multifunctional terminals may capture still or moving images, play music or video files, play games, receive broadcast signals and the like, so as to provide an integrated multimedia player. Content displayed by a mobile terminal may be controlled based on a touch input.

BRIEF DESCRIPTION OF THE DRAWINGS

The embodiments will be described in detail with reference to the following drawings in which like reference numerals refer to like elements wherein.

DETAILED DESCRIPTION

Figure 1:
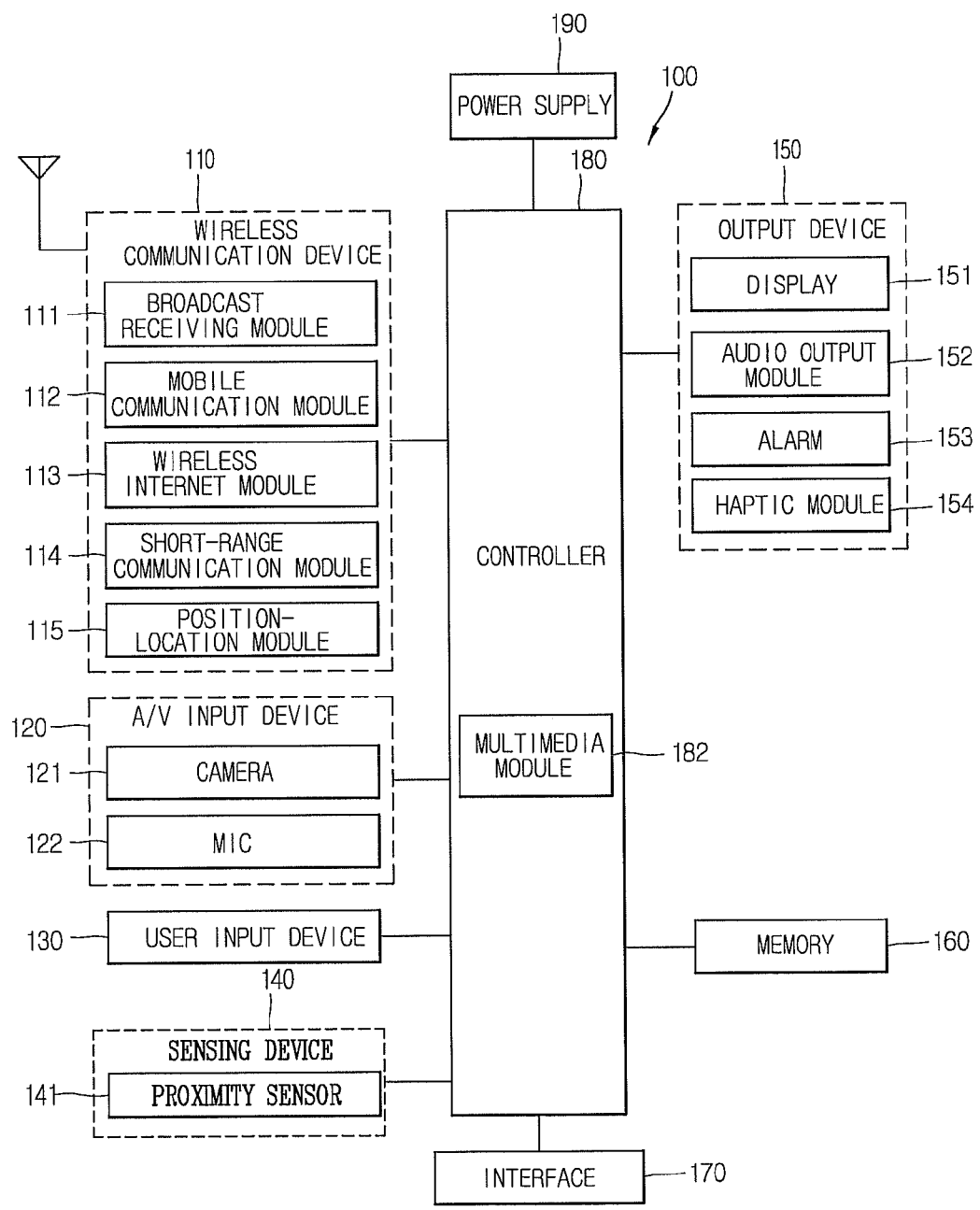
FIG. 1 is a block diagram of a mobile terminal according to an embodiment as broadly described herein.

Hereinafter, various embodiments will be described in detail with reference to the accompanying drawings to such an extent that they may be easily embodied by a person having ordinary skill in the art. However, embodiments may be implemented in various different forms, and therefore, embodiments are not limited to only the illustrated embodiments. In order to provide a clear and concise description, parts not related to the description are omitted, and like reference numerals designate like constituent elements throughout the specification.

A mobile terminal as embodied and broadly described herein may include a portable phone, a smart phone, a laptop computer, a digital broadcast mobile device, a personal digital assistant (PDA), a portable multimedia player (PMP), a navigator, and the like. However, it would be easily understood by those skilled in the art that a configuration according to the following description may also be applicable to a stationary terminal such as a digital TV, a desktop computer, and the like.

Referring to FIG. 1, a mobile terminal 100 may include a wireless communication device 110, an audio/video (A/V) input device 120, a user input device 130, a sensing device 140, an output device 150, a memory 160, an interface device 170, a controller 180, a power supply device 190, and the like. However, the constituent elements as illustrated in FIG. 1 are not necessarily required, and the mobile communication terminal may be implemented with a greater or less number of elements than the elements illustrated in FIG. 1.

The wireless communication device 110 may provide for radio communication between the mobile terminal 100 and a wireless communication system, or for radio communication between the mobile terminal 100 and a network in which the mobile terminal 100 is located. For example, the wireless communication device 110 may include a broadcast receiving module 111, a mobile communication module 112, a wireless Internet module 113, a short-range communication module 114, a position location module 115, and the like.

The broadcast receiving module 111 may receive broadcast signals and/or broadcast associated information from an external broadcast management server through a broadcast channel. The broadcast associated information may include information regarding a broadcast channel, a broadcast program, a broadcast service provider, and the like. The broadcast associated information may also be provided through a mobile communication network. In this case, the broadcast associated information may be received by the mobile communication module 112. The broadcast signal and broadcast-associated information received through the broadcast receiving module 111 may be stored in the memory 160.

The mobile communication module 112 may transmit and/or receive a radio signal to and/or from at least one of a base station, an external terminal and a server over a mobile communication network. The radio signal may include a voice call signal, a video call signal or various types of data according to text and/or multimedia message transmission and reception.

The wireless Internet module 113 may support wireless Internet access and may be built-in or externally installed on the mobile terminal 100. A variety of wireless Internet access techniques may be used, such as WLAN (Wireless LAN), Wi-Fi, Wibro (Wireless Broadband), Wimax (World Interoperability for Microwave Access), HSDPA (High Speed Downlink Packet Access), and the like.

The short-range communication module 114 may support short-range communication. A variety of short-range communication technologies may be used, such as Bluetooth, Radio Frequency IDentification (RFID), Infrared Data Association (IrDA), Ultra WideBand (UWB), ZigBee, and the like.

The position-location module 115 may acquire a location of the mobile terminal 100, and may include, for example, a GPS module.

The A/V (audio/video) input device 120 may receive an audio or video signal, and may include a camera 121, a microphone 122, and the like. The camera 121 may process an image frame, such as still or moving images, obtained by an image sensor in a video phone call or image capturing mode. The processed image frame may be displayed on a display 151 of the output device 150. The image frames processed by the camera 121 may be stored in the memory 160 or transmitted to an external device through the wireless communication device 110. Two or more cameras 121 may be provided according to the use environment of the mobile terminal 100.

The microphone 122 may receive an external audio signal through a microphone in a phone call mode, a recording mode, a voice recognition mode, and the like, and process the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated during the process of receiving the external audio signal.

The user input device 130 may generate input data to control an operation of the mobile terminal 100. The user input device 130 may be configured as a keypad, a dome switch, a touch pad (pressure/capacitance), a jog wheel, a jog switch, and the like.

The sensing device 140 may detect presence or absence of the user's contact, and a current status of the mobile terminal 100 such as an opened or closed configuration, a location of the mobile terminal 100, an orientation of the mobile terminal 100, an acceleration or deceleration of the mobile terminal 100, and the like, and may generate a sensing signal for controlling the operation of the mobile terminal 100. For example, when the mobile terminal 100 is a slide phone type, the sensing device 140 may sense an opened or closed configuration of the slide phone. Furthermore, the sensing device 140 may sense whether or not power is supplied from the power supply 190, or whether or not an external device is coupled to the interface 170.

The sensing device 140 may include a proximity sensor 141. Furthermore, the sensing device 140 may include a touch sensor for sensing a touch operation with respect to the display 151.

The touch sensor may be implemented as a touch film, a touch sheet, a touch pad, and the like. The touch sensor may be configured to convert changes of a pressure applied to a specific part of the display 151, or a capacitance generated from a specific part of the display 151, into electric input signals. The touch sensor may be configured to sense not only a touched position and a touched area, but also a touch pressure.

When the touch sensor and display 151 have an interlayer structure, the display 151 may be used as an input device rather than an output device. The display 151 may be referred to as a "touch screen".

When there is a touch input through the touch screen, the corresponding signals may be transmitted to a touch controller. The touch controller may process signals transferred from the touch sensor, and then transmit data corresponding to the processed signals to the controller 180. Accordingly, the controller 180 may sense which region of the display 151 has been touched.

When the touch screen is a capacitance type, the proximity of a sensing object may be detected by changes of an electromagnetic field according to the proximity of the sensing object. The touch screen may be categorized as a proximity sensor 141.

The proximity sensor 141 may refer to a sensor for detecting the presence or absence of a sensing object using an electromagnetic field or infrared rays without a mechanical/physical contact. The proximity sensor 141 may have a longer lifespan and more enhanced utility than a contact sensor. The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like.

Hereinafter, simply for ease of discussion, a case in which an object closely approaches the touch screen without contact will be referred to as "proximity touch", whereas a case in which the object, i.e., a pointer substantially comes in contact with the touch screen will be referred to as "contact touch".

The proximity sensor 141 may sense a proximity touch, and proximity touch patterns (e.g., distance, direction, speed, time, position, moving status, etc.). Information relating to the sensed proximity touch and the sensed proximity touch patterns may be output onto the touch screen.

The output device 150 may generate an output related to visual, auditory, and tactile senses. The output 150 may include a display 151, an audio output module 152, an alarm 153, a haptic module 154, and the like.

The display 151 may display (output) information processed in the mobile terminal 100. For example, when the mobile terminal 100 is operated in a phone call mode, the display 151 may display a user interface (UI) or graphic user interface (GUI) related to a phone call. When the mobile terminal 100 is operated in a video call mode or image capturing mode, the display 151 may display a captured image, a received image, UI, GUI, or the like.

The display 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

At least one of those displays (or display devices) included in the display 151 may be configured with a transparent or optical transparent type to allow the user to view the outside therethrough. It may be referred to as a transparent display. A representative example of the transparent display may be a transparent OLED (TOLED), and the like. In other words, the display 151 may include a first surface and a second surface overlapped with each other, and the first and the second surface may be configured with a transparent or optical transparent structure. When so configured, an object positioned at a rear side of the mobile device body may be visible through a region occupied by the display 151. Such a display 151 may be referred to as a transparent display 155 (see FIG. 3).

In certain embodiments, the mobile terminal 100 may include two or more displays 151. For example, a plurality of displays 151 may be provided on one surface of the terminal 100, in a separate or integrated manner, or may be provided on different surfaces of the terminal 100.

The audio output module 152 may output audio data received from the wireless communication device 110 or stored in the memory 160, in a call-receiving mode, a call-placing mode, a recording mode, a voice selection mode, a broadcast reception mode, and the like. The audio output module 152 may output an audio signal related to a function carried out in the mobile terminal 100 (for example, sound alarming a call received or a message received, and the like). The audio output module 152 may include a receiver, a speaker, a buzzer, and the like.

The alarm 153 may output signals indicating occurrence of an event from the mobile terminal 100. The examples of an event occurring from the mobile terminal 100 may include a call received, a message received, a key signal input, a touch input, and the like. The alarm 153 may output not only video or audio signals, but also other types of signals, such as vibration. Since the video or audio signals may be also output through the display 151 and/or the audio output device 152, the display 151 and the audio output module 152 may be included as part of the alarm 153.

The haptic module 154 may generate various tactile effects that may be felt by the user. A representative example of the tactile effects generated by the haptic module 154 may include vibration. Vibration generated by the haptic module 154 may have a controllable intensity, a controllable pattern, and the like. For example, different vibrations may be output in a synthesized manner or in a sequential manner.

The haptic module 154 may generate various tactile effects, including not only vibration, but also arrangement of pins that move vertically in response to contact with a skin surface, air injection force or air suction force through an injection port or suction port, touch by a skin surface, contact with an electrode, effects by stimulus such as an electrostatic force, reproduction of cold or hot feeling using a heat absorbing device or heat emitting device, and the like.

The haptic module 154 may be configured to transmit tactile effects through the user's direct contact, or the user's muscular sense using a finger or a hand. Two or more haptic modules 154 may be provided according to the configuration of the mobile terminal 100.

The memory 160 may store a program for operating the controller 180, or may temporarily store input/output data (for example, phonebooks, messages, still images, moving images, and the like). The memory 160 may store data related to various patterns of vibrations and sounds outputted when performing a touch input on the touch screen.

The memory 160 may be implemented using various different types of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface 170 may interface the portable terminal with external devices. The interface 170 may provide for data reception from an external device, power delivery to each component in the mobile terminal 100, or data transmission from the mobile terminal 100 to an external device. The interface 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device may be coupled to the mobile terminal 100 via a port.

The interface 170 may provide a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 may control overall operation of the mobile terminal 100. For example, the controller 180 may perform control and processing related to telephone calls, data communications, video calls, and the like. The controller 180 may include a multimedia module 182 which provides multimedia playback. The multimedia module 182 may be configured as part of the controller 180 or as a separate component. The controller 180 may perform pattern recognition processing so as to recognize a handwriting or drawing input on the touch screen as text or image.

The power supply 190 may receive external or internal power to provide power required by various components under the control of the controller 180.

Various embodiments described herein may be implemented in a computer or similar device readable medium using software, hardware, or any combination thereof. For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself. For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

Hereinafter, a method of processing a user input to the mobile terminal 100 will be described.

The user input device 130 may be manipulated to receive a command for controlling the operation of the mobile terminal 100, and may include a plurality of manipulation device commonly designated as a manipulating portion of the terminal 100.

Various kinds of visual information may be displayed on the display 151. The visual information may be displayed in the form of a character, a numeral, a symbol, a graphic, an icon, and the like. For an input of visual information, at least one of a character, a numeral, a symbol, a graphic, and an icon may be displayed with a predetermined arrangement so as to be implemented in the form of a keypad. Such a keypad may be referred to as a "soft key."

The display 151 may operate as a single region or may be divided into a plurality of regions. In case of the latter, the plurality of regions may be configured to operate in an associative way. For example, an output window and an input window may be displayed on the upper and lower portions of the display 151, respectively. The output window and the input window may be regions allocated to output or input information, respectively. A soft key on which numerals for inputting a phone number or the like may be displayed on the input window. When the soft key is touched, a numeral corresponding to the touched soft key may be displayed on the output window. When a first manipulating device is manipulated, a phone call connection for the phone number displayed on the output window may be attempted or text displayed on the output window may be entered to the application.

The display 151 or touch pad may be configured to sense a touch scroll. The user may move an object displayed on the display 151, for example, a cursor or pointer placed on an icon or the like, by scrolling the display 151 or touch pad. Moreover, when a finger is moved on the display 151 or touch pad, a path being moved by the finger may be visually displayed on the display 151. It may be useful to edit an image displayed on the display 151.

In order to cope with a case in which the display 151 and touch pad are touched together within a predetermined period of time, one function of the terminal 100 may be implemented. For example, when the user holds a body of the mobile terminal 100 using his or her thumb and forefinger, the case and the display 151 may be touched at the same time. Thus, for one of the above functions implemented in the mobile terminal 100, for example, there may be an activation or de-activation for the display 151 or touch pad.

Figure 2A:
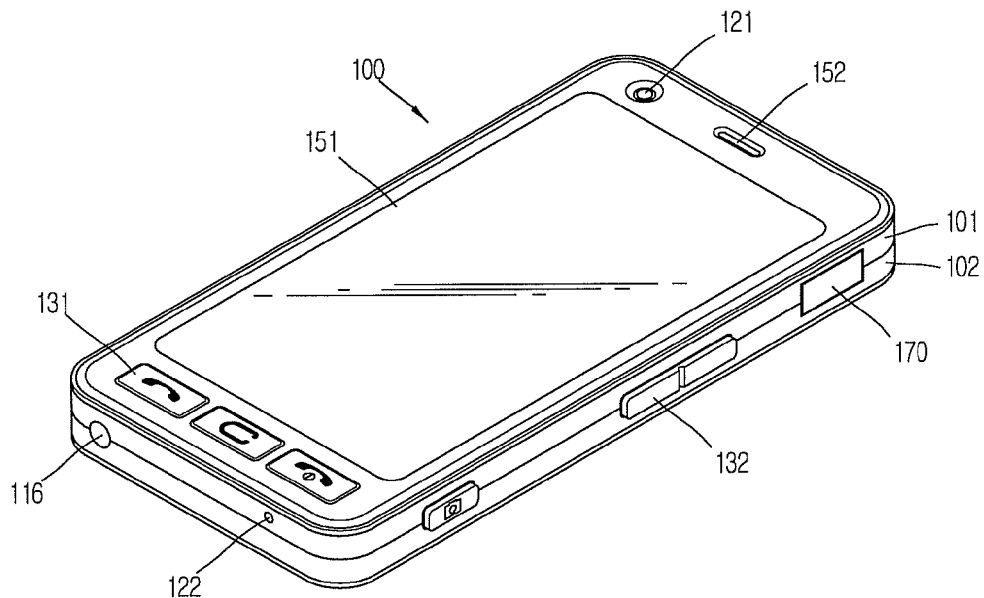
FIGS. 2A and 2B are front and rear perspective views of a mobile terminal as embodied and broadly described herein.
Figure 2B:
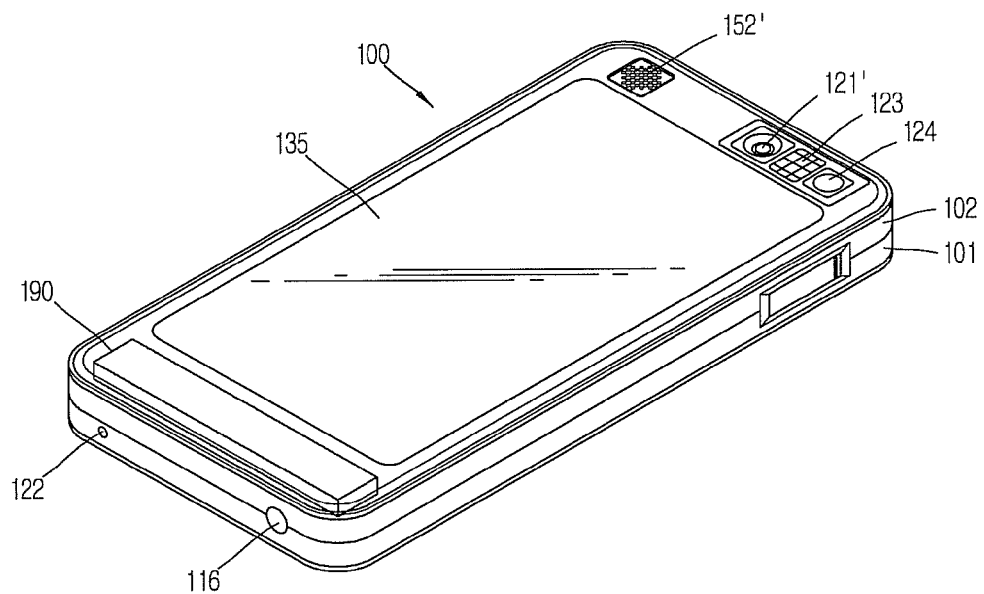

FIGS. 2A and 2B are front and rear perspective views of an exemplary mobile terminal 100 having a bar-type terminal body. However, embodiments as broadly described herein may also be applicable to various other structures of terminals such as slide type, folder type, swivel type, swing type, and the like, in which two and more bodies are combined with each other in a relatively movable manner.

The terminal body may include a case (casing, housing, cover, etc.) forming an external appearance of the terminal 100. In this embodiment, the case may be divided into a front case 101 and a rear case 102. Various electronic components may be received in a space formed between the front case 101 and the rear case 102. At least one middle case may be disposed between the front case 101 and the rear case 102.

The cases may be formed by injection-molding a synthetic resin material, or may be formed of a metal material such as stainless steel (STS), titanium (Ti), or the like.

The display 151, audio output module 152, camera 121, user input device 130, microphone 122, interface 170, and the like may be arranged on the terminal body, mainly on the front case 101.

The display 151 occupies a significant portion (most) of the front case 101. The audio output device 152 and the camera 121 may be disposed on a region adjacent to one of two opposite ends of the display 151, and a first manipulation device 131 and the microphone 122 may be disposed on a region adjacent to the other end thereof. A second manipulation device 132 and the interface 170, and the like, may be disposed on a lateral surface of the front case 101 and/or the rear case 102.

The user input device 130, including the first and second manipulation device 131 and 132, may be manipulated to receive a command for controlling the operation of the terminal 100. The first and second manipulation devices 131, 132 may receive various commands. For example, the first manipulation device 131 may receive a command, such as start, end, scroll, or the like. The second manipulation device 132 may receive a command, such as controlling a volume level being outputted from the audio output device 152, or switching into a touch recognition mode of the display 151.

Referring to FIG. 2B, another camera 121' may be additionally mounted on a rear surface of the terminal body, namely, the rear case 102. An image capturing direction of the rear camera 121' may be opposite to that of the front camera 121, and may have different number of pixels from those of the front camera 121. For example, the front camera 121 may be configured to have a relatively small pixel capacity (resolution), and the rear camera 121' may be configured to have a relatively large pixel capacity (resolution). Accordingly, in case where the front camera 121 is used for video communication, it may be possible to reduce the size of transmission data when the user captures his or her own face and sends it to the other party in real time. On the other hand, the rear camera 121' may be used for the purpose of storing high quality images. The cameras 121, 121' may be rotatably provided in the terminal body, and may be extendable/retractable relative to the terminal body.

A flash 123 and a mirror 124 may be additionally disposed adjacent to the rear camera 121'. The flash 123 may illuminate light toward an object when capturing the object with the camera 121'. The mirror 124 may allow the user to look at a reflection his or her own face, or the like, when capturing himself or herself (in a self-portrait mode) by using the rear camera 121'.

A rear audio output device 152' may be additionally disposed on a rear surface of the terminal body. The rear audio output device 152' together with the front audio output device 152 may provide a stereo function, and may also be used to implement a speaker phone mode during a phone call.

An antenna 116 for receiving broadcast signals may be disposed on a lateral surface of the terminal body. The antenna 116 constituting part of a broadcast receiving module 111 may be provided so as to be pulled out from the terminal body.

A power supply 190 for supplying power to the portable terminal 100 may be mounted on the terminal body. The power supply 190 may be configured so as to be incorporated in the terminal body, or directly detachable from the outside of the terminal body.

A touch pad 135 for detecting a touch may be mounted on the rear case 102. The touch pad 135 may be an optical transmission type, similarly to the display 151. Alternatively, a rear display for displaying visual information may be mounted on the touch pad 135. Information displayed on both surfaces of the front display 151 and rear display may be controlled by the touch pad 135.

The touch pad 135 may be operated in conjunction with the display 151 of the front case 101. The touch pad 135 may be disposed in parallel at a rear side of the display 151. The touch pad 135 may have substantially the same size as or a smaller size than the display 151.

As described above, a transparent display 155 may transmit light while displaying a predetermined image on the screen. Accordingly, the user may visually recognize an object located at an opposite side of the transparent display 155.

For such a mobile terminal 100, a thin film electroluminescent display, an organic light emitting diode, and the like may be used. Such a display may be driven with a passive matrix method, and does not require thin-film transistors (TFTs), thereby obtaining sufficiently high optical transmittance. Accordingly, they can be used for the transparent display 155. Otherwise, when TFTs are fabricated using transparent materials such as multi-component oxide semiconductor even in case where TFTs are used as in an active matrix OLED display, it may be possible to sufficiently increase optical transmittance. Hereinafter, the transparent display 155 will be described in detail with reference to FIG. 3.

Figure 3:
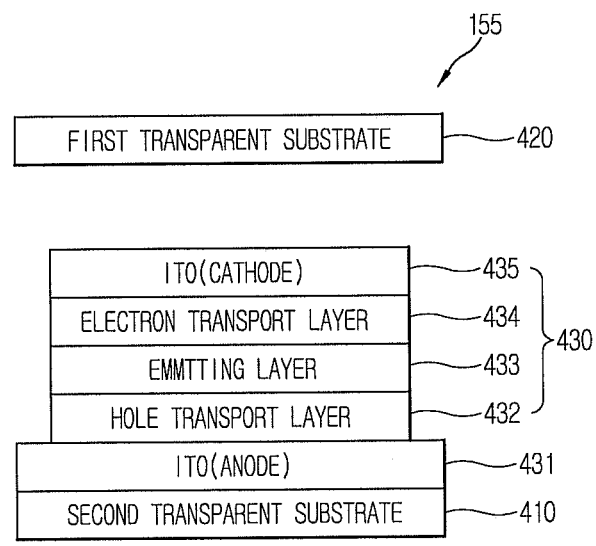
FIGS. 3, 4, 5A-5B and 6A-6B are views for explaining a mobile terminal according to an embodiment as broadly described herein.

Referring to FIG. 3, the transparent display 155 may include a first surface (first transparent substrate) 420, a second surface (second transparent substrate) 410, and an image layer 430 located between the first surface 420 and second surface 410. The image layer 430 located between the first surface 420 and second surface 410 may be also referred to as an organic cell. The first surface 420 and second surface 410 may have a characteristic of transmitting light. The image layer 430 may include an anode 431, a hole transport layer 432, an emitting layer 433, an electron transport layer 434, and a cathode 435.

When a voltage is applied between the cathode 435 and the anode 431, a gradation current is supplied, and accordingly, electrons generated from the cathode 435 move to the emitting layer 433 through the electron transport layer 434. In addition, holes generated from the anode 431 move to the emitting layer 433 through the hole transport layer 432.

Moreover, holes generated from the anode 431 move to the emitting layer 433 through the hole transport layer 432. At this time, electrons supplied from the electron transport layer 434 collide and recombine with holes supplied from the hole transport layer 432. Light is generated from the emitting layer 433 due to a collision between electrons and holes. The luminance of light generated from the emitting layer 433 may be proportional to the size of the gradation current supplied to the anode 431.

When light is generated from the emitting layer 433, light may be emitted in the direction of the first surface 420, and may also be emitted in the direction of the second surface 410. Accordingly, the user may view an image through the first surface 420, or may view an image through the second surface 410.

Figure 4:
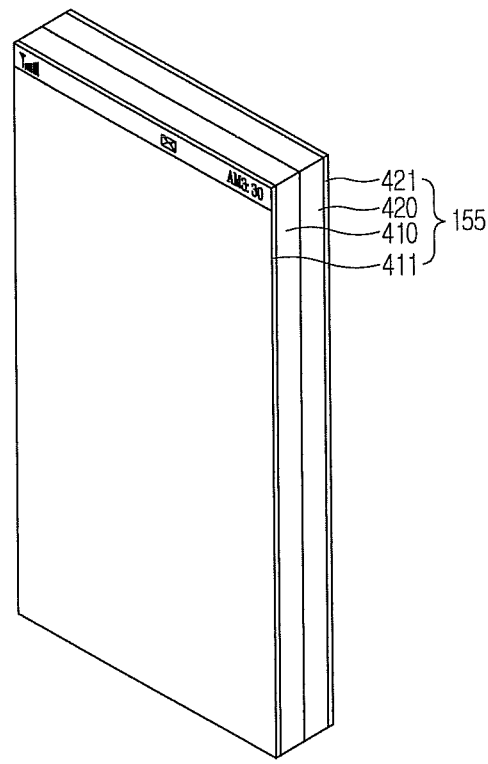

Referring to FIG. 4, the transparent display 155 may include the first and second surfaces 420, 410 and a first and second touch panel 421, 411 respectively disposed on the first surface 420 and second surface 410 of the transparent display 155. The touch panels 421, 411 may be, for example, a capacitive touch panel, a resistive touch panel, an optical touch panel, and the like.

Hereinafter, simply for ease of discussion, the illustration of the touch panels 421, 411 will be omitted, but the occurrence of a touch may refer to touch panels 421, 411 being disposed in a region on which a touch has occurred.

FIGS. 5A-5B and 6A-6B illustrate content displayed on the transparent display 155.

Figure 5A:
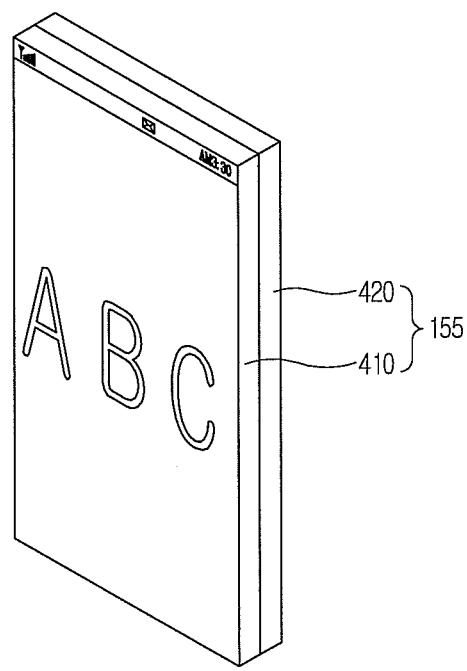
Figure 5B:
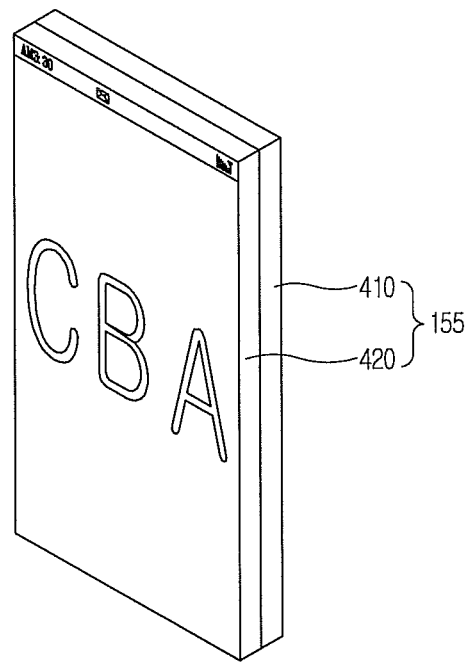

When the user views the second surface 410, the user may observe an image displayed on the transparent display 155 in the form of FIG. 5A. When the user rotates the mobile terminal 100 in the opposite direction, the user may observe an image displayed on the first surface 420 in the form of FIG. 5B. In other words, the images displayed on the first and the second surface 420, 410 may be reversed, or mirror, images of each other.

Figure 6A:
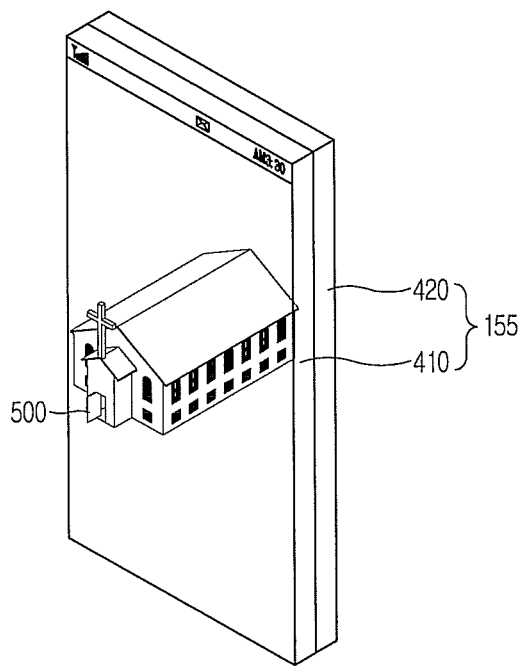

In alternative embodiments, the first and the second surface 420, 410 may display different images from each other. Referring to FIG. 6A, a first image 500 may be displayed on the second surface 410 and a second image 510 different from the first image 500 may be displayed on the first surface 420. The first image 500 may be an image for which a predetermined object is captured in a first direction, and the second image 510 may be an image for which the object is captured in a second direction which is opposite the first direction.

Figure 6B:
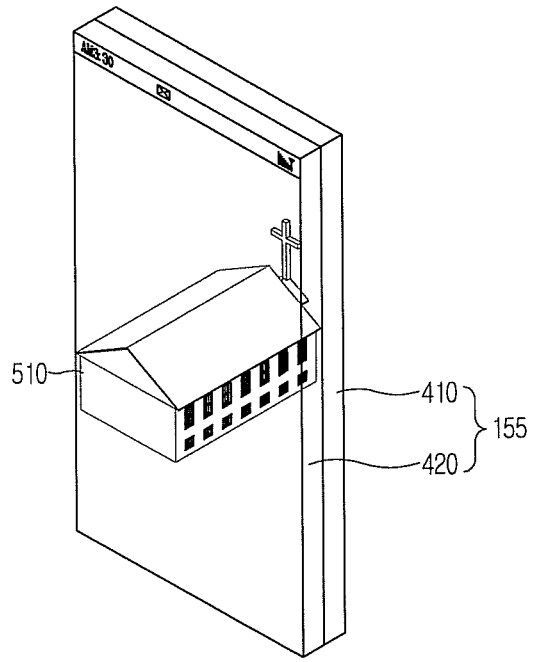

In other words, the first image 500 may be a front view of the predetermined object and the second image 510 may be a rear view of the predetermined object. For example, when the object is church, as shown in FIGS. 6A and 6B, the first image 500 may be an image for which the church is captured in the first direction and the second image 510 is captured in the second direction opposite the first direction. In this case, a provider of the image content, for instance, a broadcasting station, may provide both an image for which a predetermined object is captured in the first direction and an image for which the object is captured in the second direction.

Figure 7:
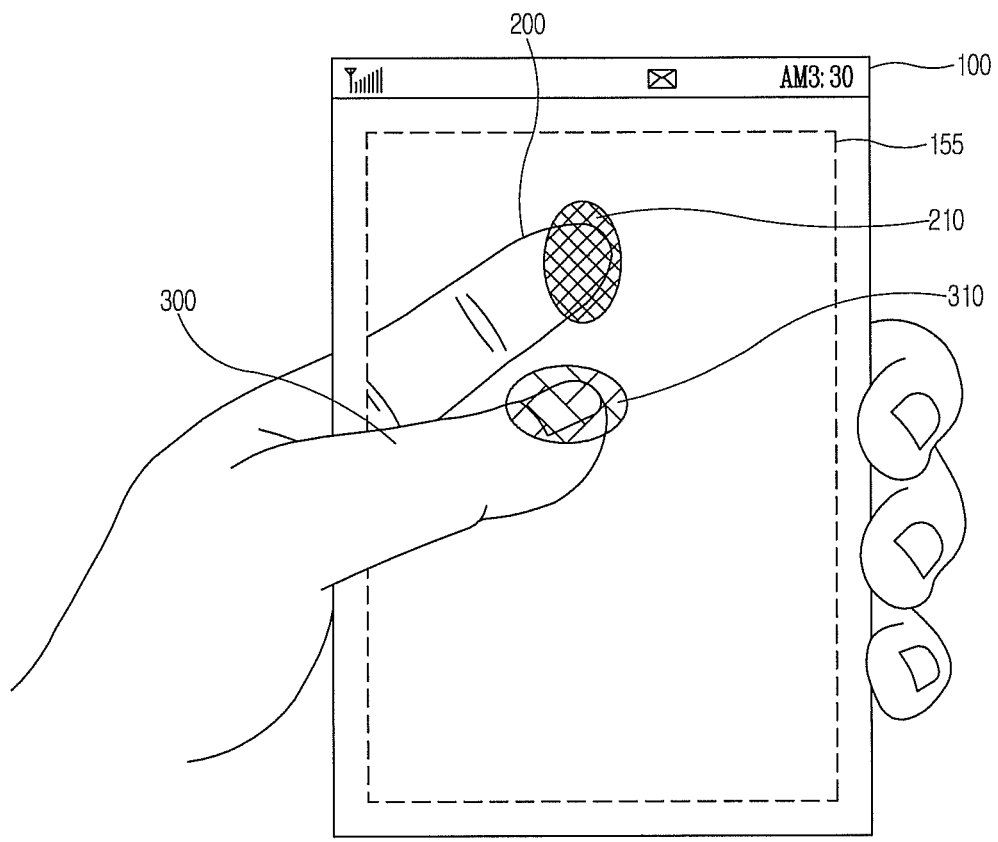
FIG. 7 is an exemplary view illustrating a mobile terminal according to an embodiment as broadly described herein.

Referring to FIG. 7, the mobile terminal 100 including a transparent display 155 may display content on the transparent display 155. Content may refer to various objects that may be displayed on the transparent display 155. For example, the content may be a menu icon for selecting a function that may be carried out by the mobile terminal 100, a multimedia icon for reproducing video data or music data that may be reproduced, an image displayed on the mobile terminal 100, a thumbnail image for showing an image stored in the mobile terminal 100, or a data name provided for various data. Furthermore, content may refer to information for producing, processing and distributing text, image, video, audio or the like in a digital form.

The content may be controlled based on a user's input sensed at the user input device 130. In particular, in case in which the transparent display 155 is configured with a touch screen, the controller 180 may implement an application containing a plurality of control functions for controlling the content when a first touch input 210 is sensed on the first surface 420. When implementing the application, at least one of the plurality of control functions may be carried out based on a second touch input 310 onto the second surface 410.

In general, when the mobile terminal 100 is held by one hand, the user may apply the first touch input 210 to the first surface 420 located at a rear facing surface of the mobile terminal 100 (surface facing away from the user) with a first finger 200 and apply the second touch input 310 to the second surface 410 located at a front facing surface of the mobile terminal 100 (surface facing toward the user) with a second finger 300. The first finger 200 may be, for example, an index finger, and the second finger 300 may be a thumb.

In the arrangement shown in FIG. 7, it is assumed that the mobile terminal 100 is controlled by one hand, but embodiments are not limited to this. In other words, the user may input a first and a second touch input using both hands, or using a tool.

When the user holds the mobile terminal 100 in this manner, various touch inputs may be sensed on the first surface 420. In order to prevent a malfunction based on these various touch inputs, the controller 180 may sense a touch input sensed on the first surface 420 that is applied for a longer period of time than a reference time to be the first touch input 210. For example, the first touch input 210 may be a touch input sensed at the same position for more than two seconds. For another example, the first touch input 210 may be a touch input sensed at a pressure greater than a reference pressure.

When an application is carried out in response to the first touch input 210, at least one of the plurality of control functions associated with the application may be carried out based on the second touch input 310. In other words, even though the second touch input 310 is sensed, different control functions may be carried out based on whether or not the application is carried out.

The application may be carried out only when the first touch input 210 is sensed on the first surface 420. In other words, when a touch input of the first touch input 210 is released, the controller 180 may terminate the implementation of the application. For example, when the application is terminated in a state in which at least one control function is carried out based on the second touch input 310, content may be displayed on the transparent display 155 corresponding to the control function being carried out. For another example, when the application is terminated, at least one control function that has been carried out based on the second touch input 310 may be cancelled and the content may be displayed on the transparent display 155 in a state prior to the implementation of the application. Such contrary embodiments may be changed based on the control mode of the application, and the control mode may also be changed by the user.

As a result, the mobile terminal 100 may implement an application in response to the first touch input 210, and may implement at least one of the plurality of control functions based on the second touch input 310, and thus the user may use various control functions with a simple manipulation. Even in a state that the mobile terminal 100 is held by one hand, the content may be controlled using the hand holding the mobile terminal 100, thereby enhancing user convenience.

Figure 8:
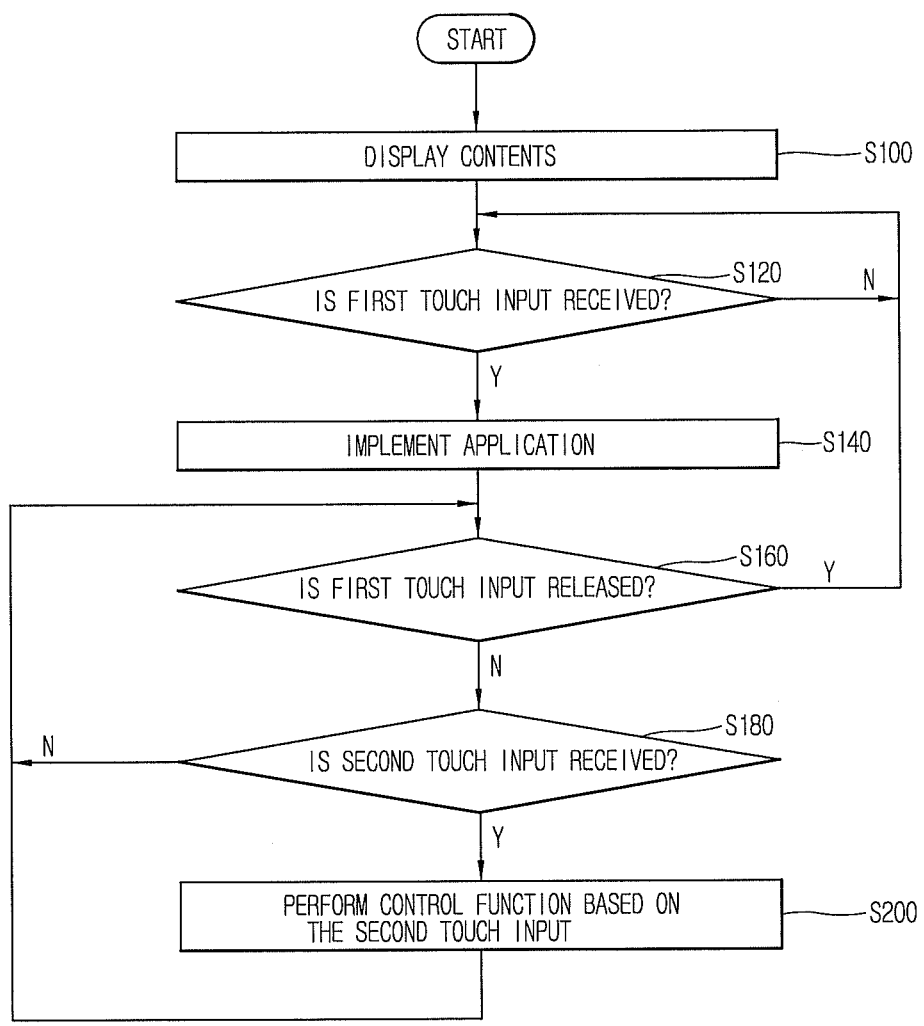
FIG. 8 is a flow chart of a method of controlling a mobile terminal, according to an embodiment as broadly described herein.

Referring to FIG. 8, a method of controlling the mobile terminal 100, as embodied and broadly described herein, may include displaying content on the display 151 (S100). In terminal 100 including the transparent display 155, content may be displayed on the first and the second surface 420, 410.

The terminal 100 may then sense a first touch input (S120). The first touch input 210 may be sensed on the first surface 420. When the first touch input 210 is sensed, the controller 180 may sense a touch position corresponding to the first touch input 210, and control the transparency of a partial region including the touch position. For example, a partial region containing the touch position of the first touch input 210 may be allowed to be transparent, and thus displayed in a different manner from the other remaining regions. Through this, the user may visually check the first touch input 210, and indirectly recognize that the application has been carried out.

After the first touch input 210 is sensed, an application may be executed (S140). The application may typically refer to a set/series of computer programs to perform a specific operation. However, as a program including a plurality of control functions for controlling content, the application may refer to a program performing at least one of a plurality of control functions based on the first and the second touch input 420, 410.

Next, the terminal 100 may sense whether or not the first touch input 210 has been released, and may return to the step of displaying content (S100) when the first touch input 210 is released, and processed to sensing whether a second touch input 310 has been received (S180) when the first touch input 210 is not released. In other words, the mobile terminal 100 may terminate the implementation of the application when the first touch input 210 is released (S160).

Next, when the second touch input 310 is not sensed, the process may return to sensing whether or not the first touch input 210 is released (S160). On the contrary, when the second touch input 310 is sensed (S180), the may proceed to performing a control function based on the second touch input 310 (S200). The controller may sense the second touch input 310 on the second surface 410, and implement a control function corresponding to the sensed second touch input 310 from a plurality of control functions stored in the memory 160.

The plurality of control functions may include, for example, deleting a file corresponding to the content, transferring a file, storing a file, increasing volume, decreasing volume, playing the next file, and playing the previous file, enlarging or reducing the content, enlarging or reducing a region displayed with the content, moving a region displayed with the content, capturing at least part of the content, and releasing the lock. A more detailed description of the plurality of control functions will be provided with reference to FIGS. 9 through 28.

Figure 9:
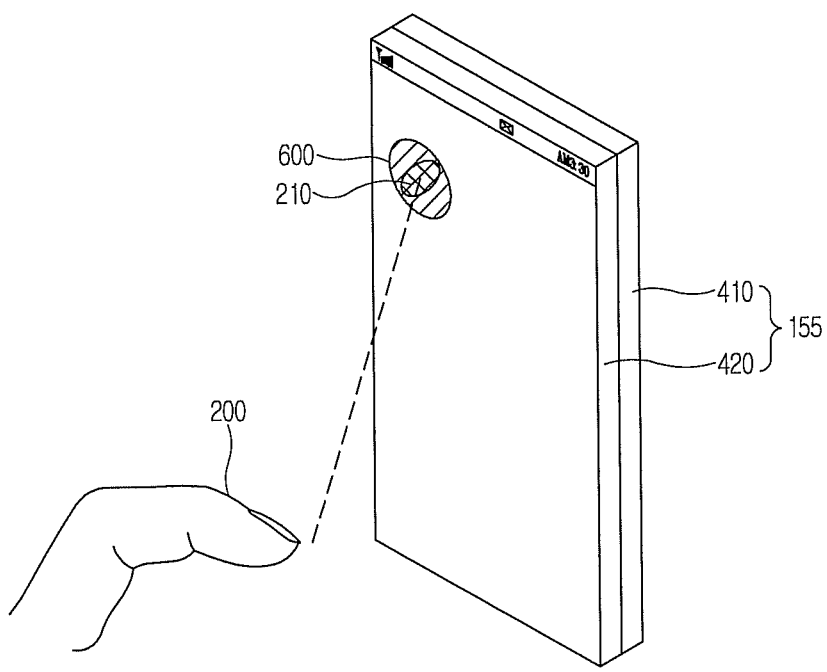
FIGS. 9, 10 and 11A-11B are exemplary views for explaining a first region of a display, according to an embodiment as broadly described herein.

Referring to FIG. 9, the transparent display 155 may include the first surface 420 and the second surface 410.

When the foregoing first touch input 210 is sensed on the first surface 420, the controller 180 may sense a touch position of the first touch input 210 and set a region containing the touch position as a first region 600. Accordingly, the touch position itself of the first touch input 210 may be the first region 600.

In certain embodiments, the first region 600 may be a circle having a radius of, for example 1.5 cm. The first region 600 may be configured in various other shapes and sizes as appropriate. The first region 600 may be configured at the same time as implementing the application, or may be configured after implementing the application, based on the first touch input 210.

Figure 10:
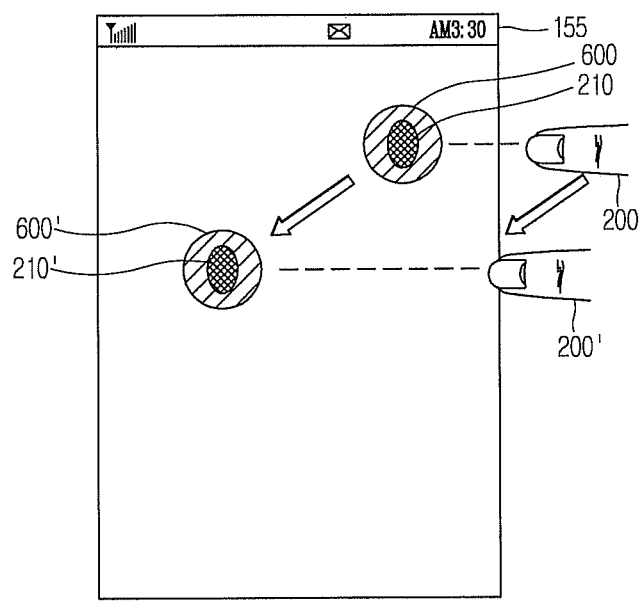

FIG. 10 illustrates the second surface 410 including the first region 600 defined in response to the first touch input 210. At this point, the first touch input 210 may be drag-moved from the first region 600. The drag movement may refer to movement of the first touch input 210 from the first touch position to a second touch position without releasing the touch input. When the drag movement of the first touch input 210 is sensed, the controller 180 may reconfigure the first region 600 based on the drag movement. Referring to FIG. 10, when moving the first touch input (210→210'), a region containing the moved touch position may be reconfigured (600→600').

Figure 11A:
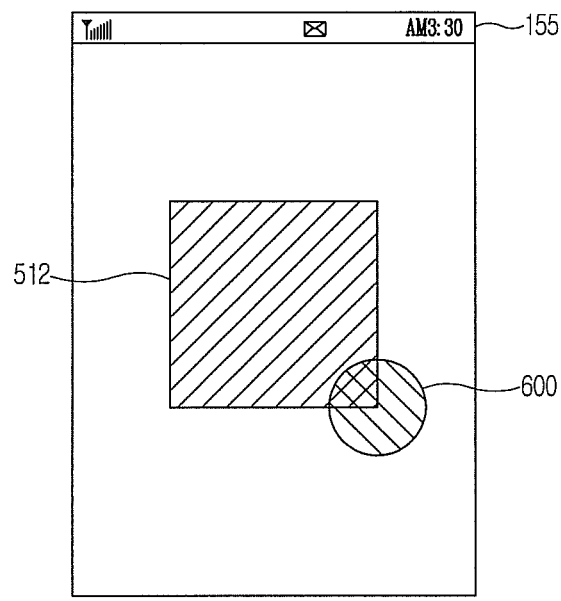
Figure 11B:
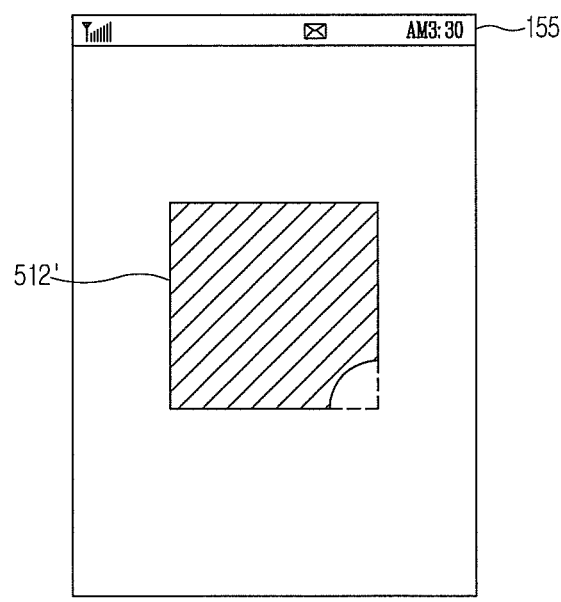

Referring to FIG. 11A, content 512 may be displayed on at least part of the transparent display 155. The controller 180 may implement an application in response to the first touch input 210, and configure the first region 600. At this time, the controller 180 may control the transparency of the first region 600, or the remainder of the display area excluding the first region 600. For example, referring to FIG. 11B, for the content 512 displayed on the transparent display 155, a portion of the content 512 overlapped with the first region 600 may become transparent. Alternatively, contrary to the illustration of FIG. 11B, the remaining region excluding the first region 600 may become transparent.

The controller 180 may implement an application in response to the first touch input 210, and thus control the transparency of the first region 600 or the remaining region thereof. Accordingly, the user may indirectly recognize that the application has been carried out, and visually check the first touch input 210.

In certain embodiments, a third touch input may be sensed in the first region 600. When a third touch input onto the first region 600 is sensed, it may be returned, or restored, to a state prior to the implementation of the application. In other words, when a third touch input is sensed in the first region 600 while at least one of the control functions is carried out, the controller 180 may cancel the performed control function and restore it to a state prior to performing the control function. This may be referred to as initialization of the application.

For example, when a third touch input is sensed in the first region 600 in a state in which a total of three control functions are carried out while the application is also carried out, the controller 180 may cancel the most recently performed control function of the three control functions. When the third touch input is sensed twice in the first region 600, the controller 180 may cancel the two most recently performed control functions of the three control functions.

For another example, the third touch input may be a multi-touch input that is different from the second touch input. The multi-touch input may refer to at least two or more touch inputs sensed within a specified period of time (for example, approximately one second). In this case, all control functions performed while the application is carried out will be cancelled.

Figure 12A:
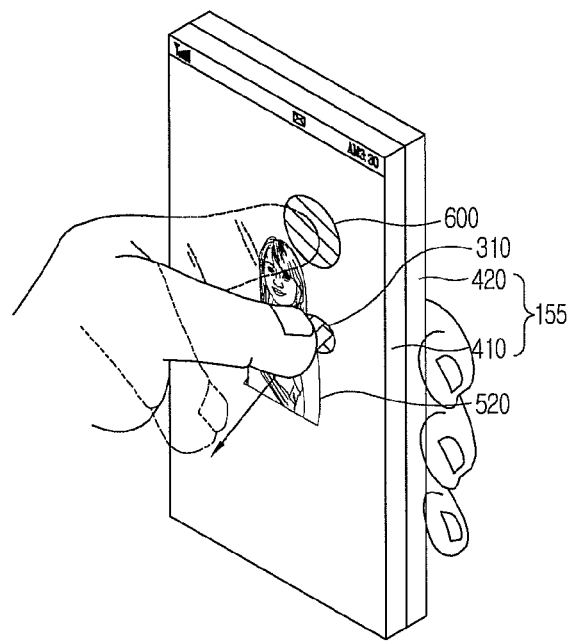
FIGS. 12 through 21 illustrate execution of various functions of a mobile terminal, according to an embodiment as broadly described herein.

FIGS. 12 through 14 are exemplary views of the transparent display 155 on which the same content 520 is controlled by at least one of the second or the third touch input 310, 320 while the application is carried out. In these examples, the first touch input 210 is continuously held on the first surface 420, and thus the application is being carried out. Furthermore, it is assumed that the content 520 displayed in FIG. 12A corresponds to an original image. The controller 180 may implement the application and configure the first region 600 in response to the second touch input 310 onto the second surface 410. The second touch input 310 may be a drag input moved to the final touch position from the initial touch position. The controller 180 may implement at least one of the plurality of control functions based on the drag direction of the second touch input 310.

For example with reference to FIG. 12A, the controller 180 may enlarge or reduce the content 520 displayed on the transparent display 155 according to whether the drag direction of the second touch input 310 is further away from the first region 600 or closer to the first region 600.

In other words, the controller 180 may sense a first and a second touch position of the second touch input 310, and calculate whether the second touch position is further away from or closer to the first region 600 based on the first touch position. Accordingly, the controller 180 may enlarge or reduce the size of the content 520 using the calculated data.

For another example, when the second touch input 310 is a drag input started from the first region 600 and moved out of the first region, the controller 180 may enlarge the content 520. On the contrary, when the second touch input 310 is a drag input started from a region excluding the first region 600 and terminated in the first region 600, the controller 180 may reduce the content 520.

Furthermore, the controller 180 may calculate a distance value between the first and the second touch position corresponding to the second touch input 310. The controller 180 may adjust a level of the enlargement or reduction of the content 520 using the distance value. For example, as the distance value changes, the size of the content 520 may be enlarged or reduced accordingly.

Figure 12B:
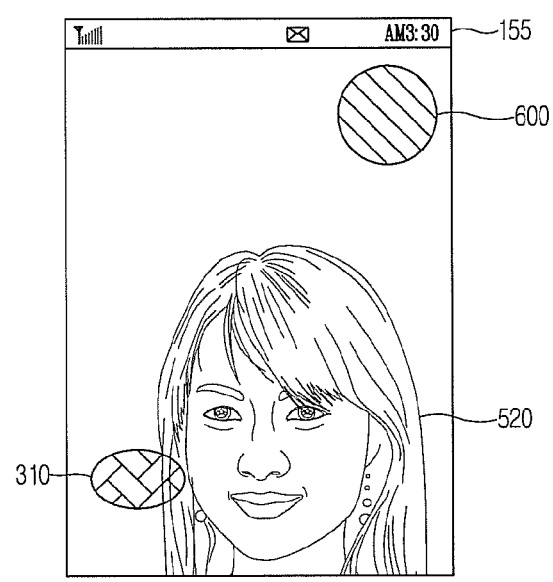

FIG. 12B illustrates the transparent display 155 in which the enlarged content 520 is displayed as a result of the second touch input 310 illustrated in FIG. 12A. Although a finger or touch pen applying a touch input is not shown, it is understood that the first touch input 210 is sensed in the first region 600 and the second touch input 310 is sensed on the second surface 410.

Referring to FIGS. 12A and 12B, the controller 180 may enlarge or reduce the content 520 based on a position of the first region 600 and a drag-move of the first touch input 210 on the first surface 420 to reconfigure the first region 600 and enlarge or reduce the content 520 based on the reconfigured first region 600.

Figure 12C:
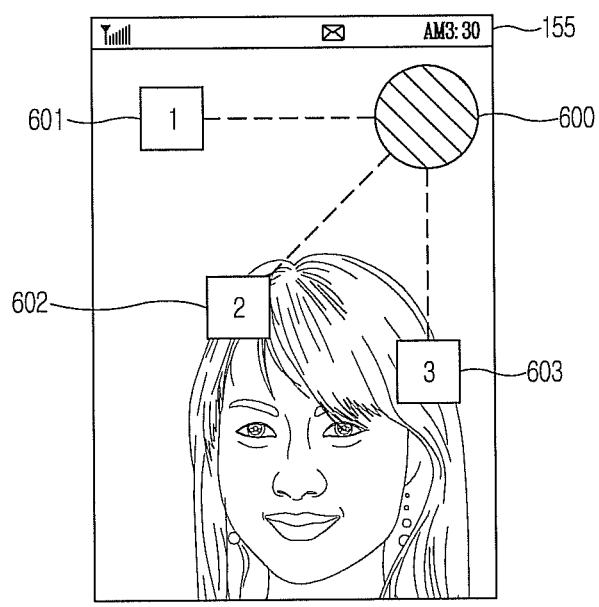

Referring to FIG. 12C, the transparent display 155 is in a state in which a touch of the second touch input 310 is released after the content 520 has been enlarged by the second touch input 310.

When at least one of the plurality of control functions is performed by the second touch input 310 and then a touch of the second touch input 310 is released, the controller 180 may display control menus 601-603 associated with the content 520 around the first region 600, separated from one another on the transparent display 155.

In particular, when the content is an image, referring to FIG. 12C, a representative image of one or more social networking services (SNS) to which the image may be uploaded may be displayed as one or more menus. The representative image may be a trademark, a thumbnail image for which the thumbnail is simplified, a name of the social networking service, and the like. The representative image may be an image stored in the memory 160 or provided from the social networking service. When a touch input onto any one of the menus 601-603 displayed on the transparent display 155 is sensed, the controller 180 may transfer or upload the content 520 displayed on the transparent display 155 to the selected social networking service.

The content having been enlarged or reduced by the second touch input 310 may be uploaded without uploading the original content 520. In other words, not an image illustrated in FIG. 12A, but an image illustrated in FIG. 12C, may be transferred to the social networking service. As a result, it may be possible to edit content using the second touch input 310 and transfer the content edited by the second touch input 310 to an external server without using a separate editing program.

For another example, the menus 601-603 may correspond to at least one of a function of deleting content, a function of overwriting the original and storing the data, a function of storing with a different name from the original, a function of transferring text with an attached file, a function of transferring a mail with an attached file, and a function of transferring data to an external server. In this case, the controller 180 may perform a function corresponding to the menu in response to a touch input onto the menu.

The menus 601-603 displayed on the transparent display 155 may be changed in response to the user's selection. For example, referring to FIG. 12C, menus for a first external server 601, a second external server 602, and a third external server 603 may be displayed, and in this case, the user may change the configuration to add a new menu or display only one menu.

A touch input sensed in the remaining region, excluding a region on which the menu is displayed, may cause the foregoing menus 601-603 displayed on the transparent display 155 to no longer be displayed on the transparent display 155. Otherwise, as the first touch input 210 is released, the application may be terminated, and thus the menus 601-603 displayed on the transparent display 155 are not longer displayed on the transparent display 155.

Figure 13A:
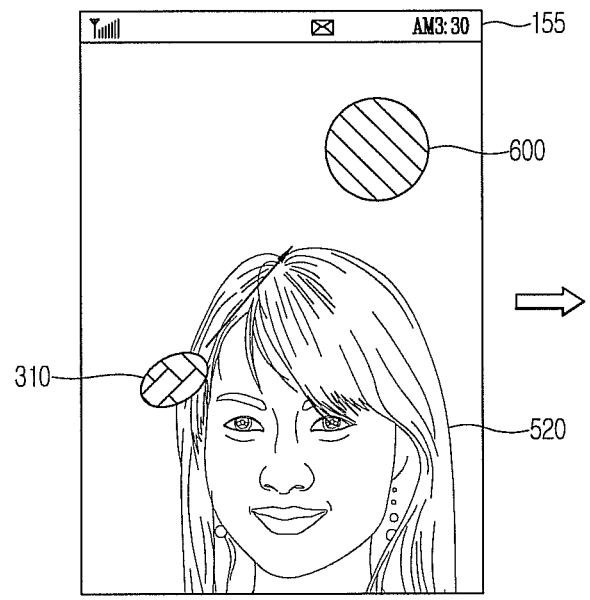
Figure 13B:
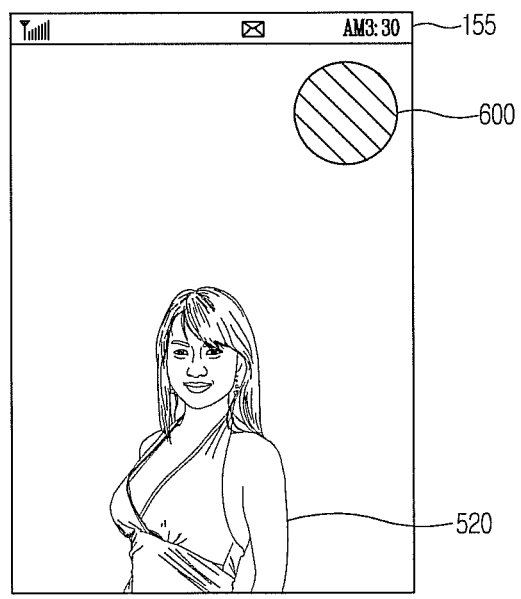

Referring to FIG. 13A, the transparent display 155 is shown in a state in which the second touch input 310 is maintained, without being released, as was the case in FIG. 12B. In this case, the controller 180 may enlarge or reduce the content 520 in real time as the second touch input 310 moves. In other words, when the drag direction of the second touch input 310 is further away from the first region 600, it may be possible to enlarge the content 520. Then, when the second touch input 310 subsequently sensed in a state that the content 520 is enlarged is a drag input closer to the first region 600, the controller 180 may reduce the content 520 as shown in FIG. 13B. Thus, it may be possible to reduce and then enlarge the content. Referring to FIG. 13B, the transparent display 155 is shown in a state in which the second touch input 310 is released. When at least one of the enlargement or reduction of the content 520 is carried out by the second touch input 310 and then the second touch input 310 is released, the content 520 having the control function carried out may be displayed on the transparent display 155.

Figure 14A:
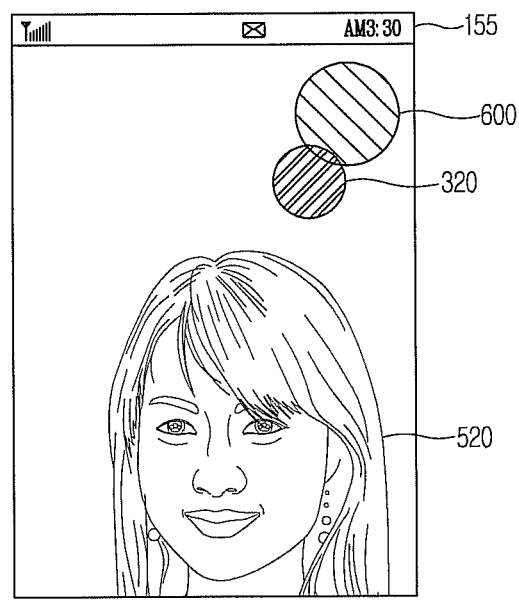

Referring to FIG. 14A, the transparent display 155 may display content 520 enlarged by the second touch input 310. When the second touch input 310 is dragged back to the first region 600 and released, the at least one control function performed is response to the second touch input 310 is complete. In other words, when the second touch input 310 is sensed in the first region 600, the controller 180 may restore the content 520 back to an original state. In certain embodiments, this same action may be carried out by a third touch input 320 at the first region 600. The third touch input 320 may be a touch input at which a touch position of the touch input onto the first surface 420 corresponds to a touch position of the touch input onto the second surface 410. For another example, the third touch input 320 may be a touch input sensed in the first region 600 of the second surface 410.

Figure 14B:
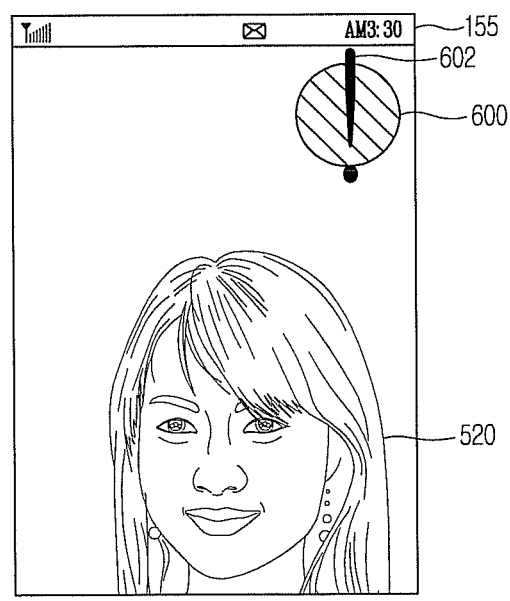

FIG. 14B illustrates the transparent display 155 in which the third touch input 320 is sensed on the second surface 410. When the third touch input 320 is sensed on the second surface 410, the controller 180 may display a notification icon 605 for notifying that the third touch input 320 has been sensed in the first region 600. For another example, the controller 180 may cause the mobile terminal 100 to vibrate for a predetermined period of time to provide this notification.

For still another example, the controller 180 may notify that the third touch input 320 has been sensed by instantly brightening the transparent display 155 and restoring it to an original state. In other words, the controller 180 may instantly control the brightness of the transparent display 155, thereby generating a blinking effect. Otherwise, the controller 180 may display the first region 600 differently from the remaining region in response to the third touch input 320 by applying color change to the first region 600 or adjusting the brightness of the first region 600.

Figure 14C:
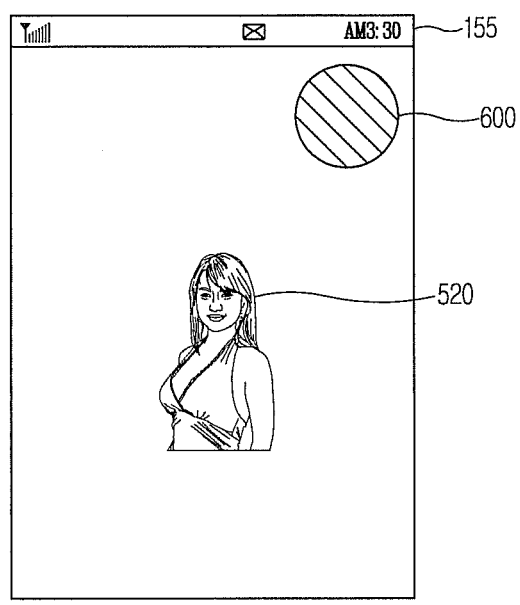

Referring to FIG. 14C, it may be possible to check the transparent display 155 on which the content originally restored by the third touch input 320 is displayed. In other words, in FIG. 14C, content 520 has been enlarged by the second touch input 310, and then the enlargement function is cancelled by the third touch input 320, and restored to an original state.

Figure 15A:
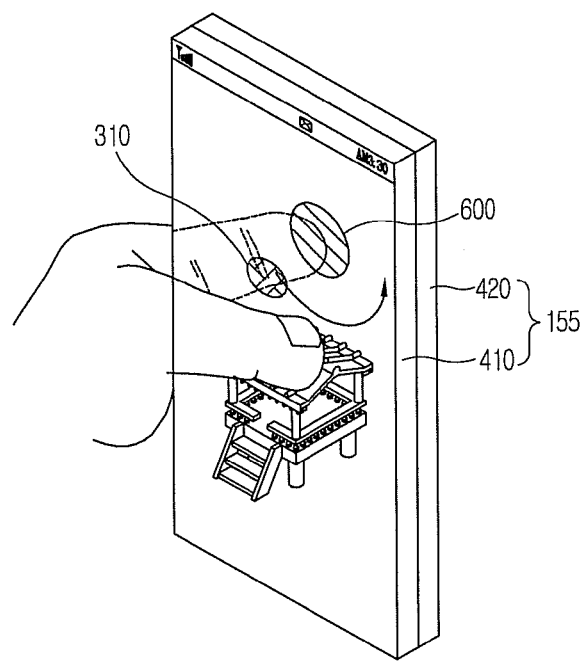

Referring to FIG. 15A, content 530 may be displayed on the transparent display 155, and the application may be carried out to configure the first region 600. In this example, the second touch input 310 is a drag input that may be rotated in a clockwise direction or counter-clockwise direction based on the first region 600. When the drag direction of the second touch input 310 is rotated based on the first region 600, the controller 180 may rotate the content 530 based on the second touch input 310. The rotation level and rotation direction of the content may vary based on the movement distance and drag direction of the drag input.

For another example, the controller 180 may rotate the content 530 even when the first touch input 210 is a drag input and the first touch input 210 is rotationally moved. More specifically, the second touch input 310 may be sensed in the same region as the first surface 420 for a prescribed period of time. In this case, the controller 180 may rotate the content 530 according to whether or not the first touch input 210 is rotated based on a touch position of the second touch input 310.

Figure 15B:
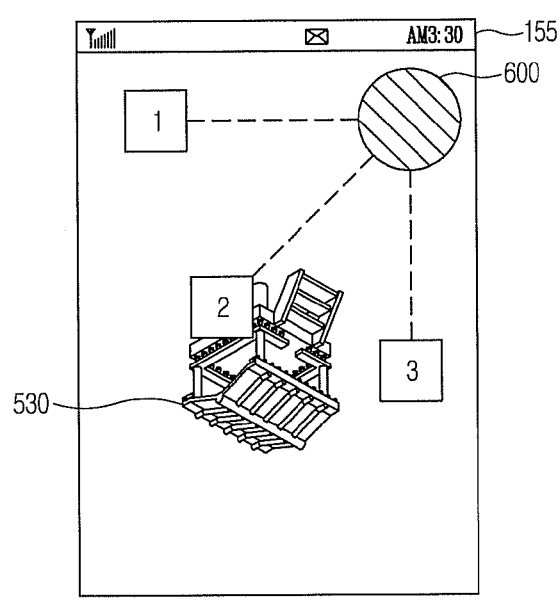

In FIG. 15B, the transparent display 155 is shown in a state in which the content 530 is rotated by the second touch input 310 and the second touch input 310 is released. The controller 180 may perform at least one control function based on the second touch input 310 in a state that the application is carried out, and display control menus 601-603 associated with the content when a touch input of the second touch input 310 is released.

Figure 15C:
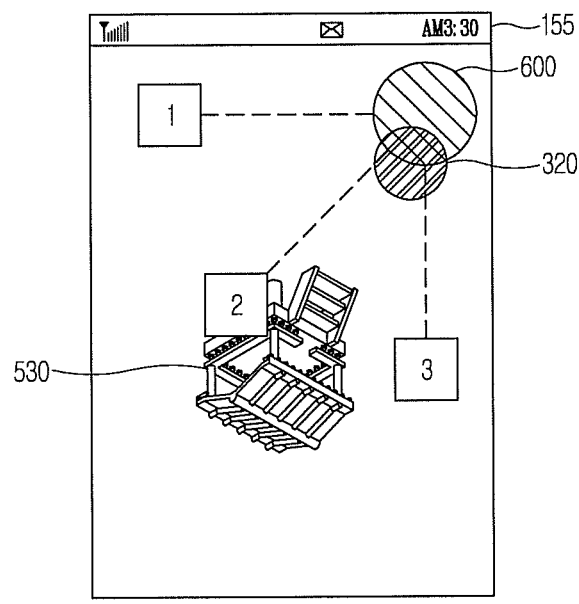
Figure 15D:
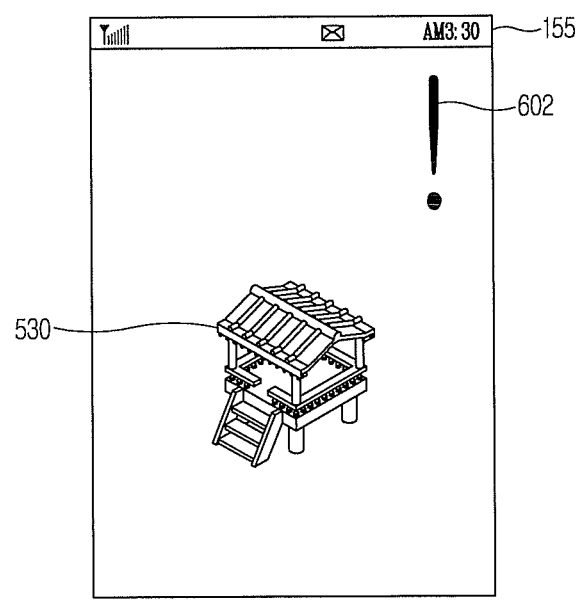

In FIGS. 15C and 15D, the transparent display 155 is shown in a state in which the third touch input 320 is sensed. Referring to FIG. 15C, when the third touch input 320 is sensed in the first region 600 of the second surface 410 as described above, the controller 180 may acknowledge the fact that the third touch input 320 has been sensed using at least one of the display 151, audio output module 152, alarm 153 or the haptic module 154. Furthermore, the controller 180 may cancel at least one control function for the content 530 based on the second touch input 310, and restore the content to a state prior to cancellation, and display the restored content on the transparent display 155.

FIGS. 16A-16D and 17A-17C are exemplary views illustrating the transparent display 155 displaying a plurality of content according to an embodiment as broadly described herein.

Figure 16A:
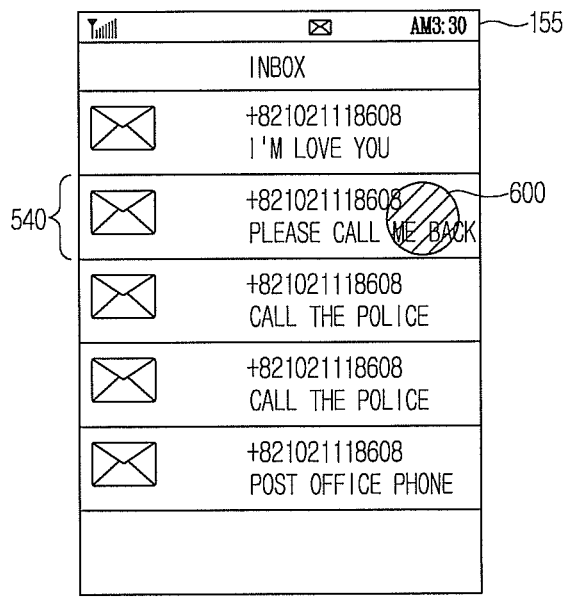

Referring to FIG. 16A, a message inbox may be displayed on the transparent display 155. In this case, the message inbox may include a plurality of text messages, each text message corresponding to content. The controller 180 may implement an application and configure the first region 600 in response to the first touch input 210. In particular, when a plurality of content items are displayed, the controller 180 may search any one content item 540 located in the first region 600. For example, when a plurality of content items are located in the first region 600, content having the largest area overlapping with the first region 600 may be selected.

Figure 16B:
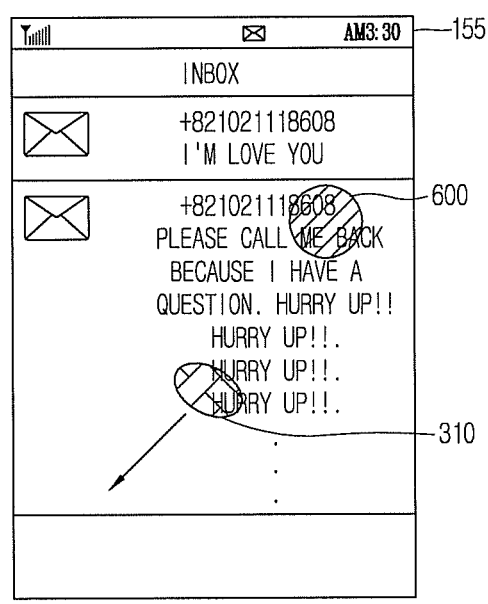

Then, the controller 180 may enlarge or reduce an area displayed with the searched one content 540 based on the second touch input 310. Referring to FIG. 16B, the second touch input 310 is a drag input, and the drag direction of the second touch input 310 may be further away from the first region 600 or closer to the first region 600. The controller 180 may enlarge or reduce an area displayed with the selected content based on the drag direction of the foregoing second touch input 310.

Furthermore, the controller 180 may calculate a distance value between the first touch position and second touch position of the second touch input 310. The controller 180 may adjust the level of the enlargement or reduction of an area displayed with the content using the distance value. For example, as the distance value increases or decreases, the size of an area displayed with the content may be enlarged or reduced accordingly.

According to another embodiment, when the second touch input 310 is a drag input initiated in the first region 600 and moved out of the first region 600, the controller 180 may enlarge an area displayed with the content. On the contrary, when the second touch input 310 is a drag input started in a region outside of the first region 600 and terminated in the first region 600, the controller 180 may reduce an area displayed with the content.

Figure 16C:
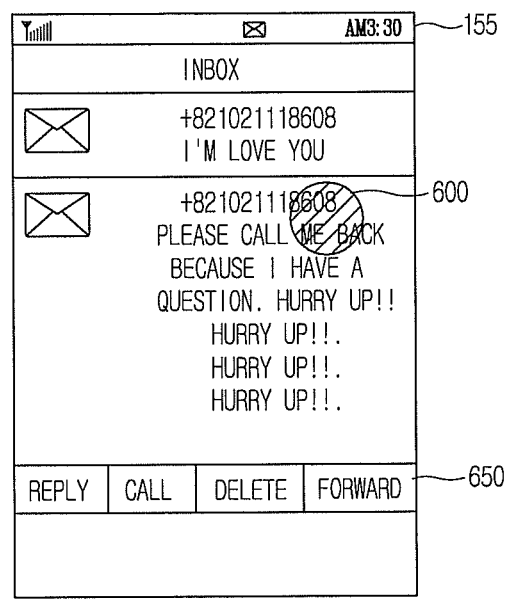

Referring to FIG. 16C, when the second touch input 310 is terminated while the application is carried out, menus 650 associated with the content may be displayed. When a touch input is sensed on at least one of the menus 650 associated with the content, a function corresponding to the menu sensed with the touch input may be carried out. For another example, when a drag input onto any one of the menus 650 is sensed from the first region 600, a function corresponding to the appropriate menu 650 may be carried out.

Furthermore, when a third touch input is sensed in the first region 600 in the state of FIG. 16C, the performed control function may be cancelled and thus returned to the state of FIG. 16A.

Figure 16D:
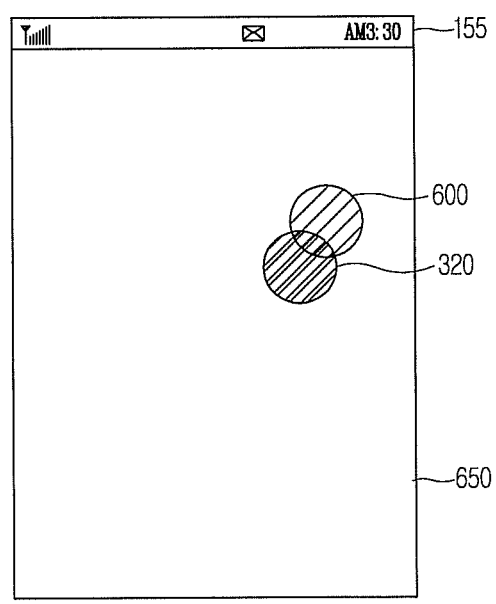

Referring to FIG. 16D, the transparent display 155 is shown in a state in which the third touch input 320 is sensed in the first region 600 of the second surface 410. As described above with reference to FIGS. 14 and 15, when the second touch input 310 is sensed, the controller 180 may cancel at least one control function based on the second touch input 310, and restore the content to a state prior to cancellation.

Accordingly, the controller 180 may restore the transparent display 155 to a state illustrated in FIG. 16A in response to the third touch input 320.

Figure 17A:
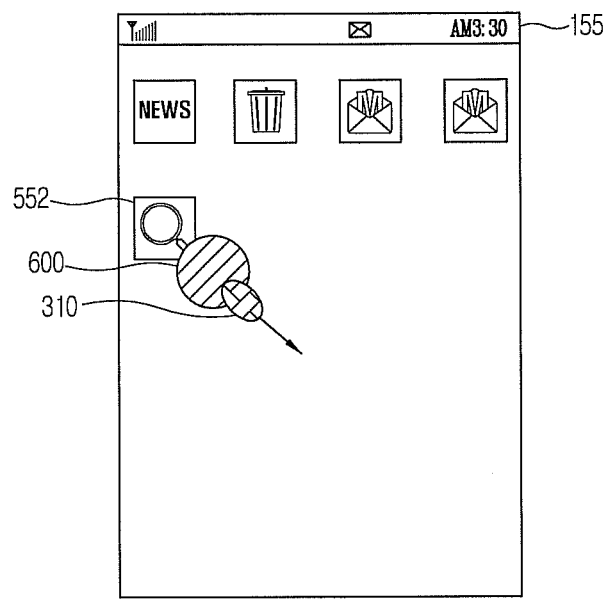
Figure 17B:
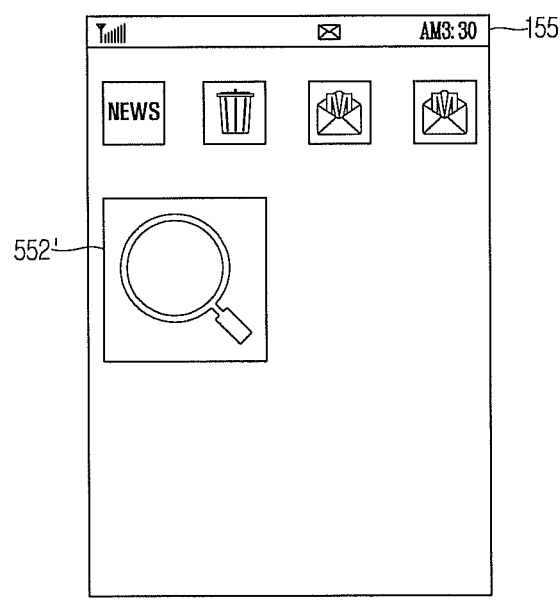
Figure 17C:
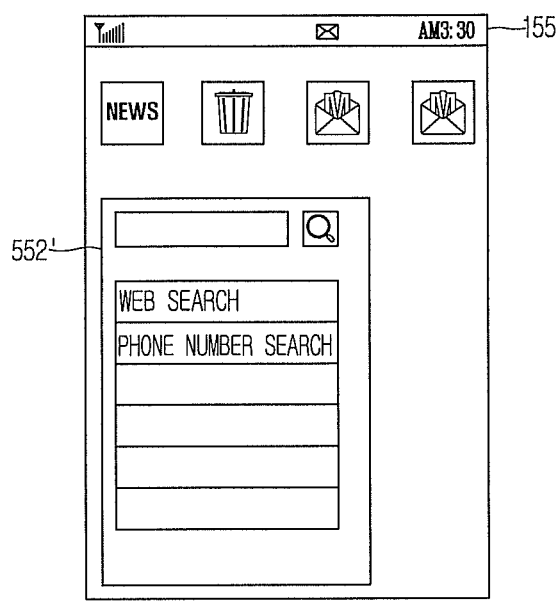

Referring to FIG. 17A, a plurality of icons may be displayed on the transparent display 155 for the home screen. As described above with reference to FIG. 16A, the controller 180 may search any one content item 552 located in the first region 600 among a plurality of content displayed on the transparent display 155. Furthermore, referring to FIG. 17B, the controller 180 may enlarge or reduce the searched content 552 according to the drag direction of the second touch input 310. This may be applicable to, for example, a photo album displayed with thumbnail images having a predetermined size.

The controller 180 may search any one content 552 located in the first region 600 among a plurality of contents displayed on the transparent display 155, and change the data of the displayed content while enlarging or reducing an area displayed with the content based on the second touch input 310.

For example, referring to 17C, the content 552 located in the first region 600 may be an icon for performing a search function. As an area displayed with the content is enlarged by the second touch input 310, a window capable of entering a search word, a bulletin containing search history information, a search condition input window capable of configuring a search condition, and the like may be displayed together. In the content 552' The changed item may be stored in the memory 160, and thus maintained even in case where a touch of the first touch input 210 is released to terminate the application. On the contrary, when an area displayed with content 552 located in the first region 600 is reduced, a thumbnail image or icon may be displayed.

FIGS. 18A-18C and 19A-19D are exemplary views illustrating the mobile terminal 100 in which the location of content is changed based on the second touch input 310.

Figure 18A:
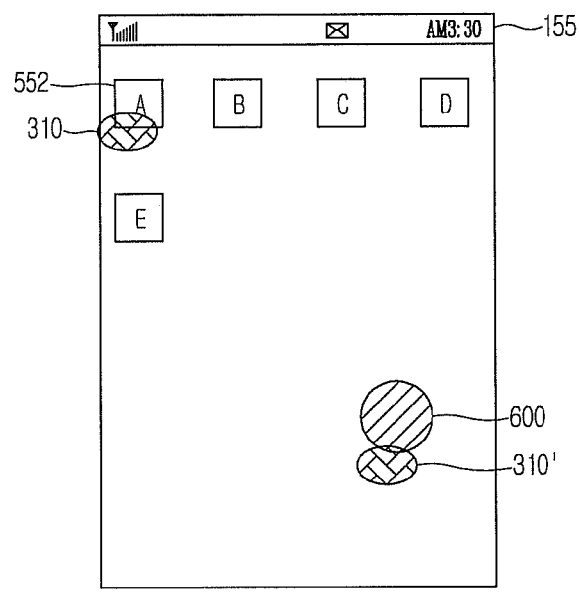

Referring to FIG. 18A, a plurality of content items 554 may be displayed on the transparent display 155. The controller 180 may search any one content item 554 located in the first region 600. If there is no content located in the first region 600 though a plurality of content items 554 are displayed on the transparent display 155, then the controller 180 may perform a control function for changing the location of the content 554 based on the second touch input 310. For example, when the second touch input 310 is sensed, the controller 180 may search a touch position of the second touch input 310 and search content located at the touch position. On the contrary, if the second touch input 310 is not a drag input even though there is content located in the first region 600, then the controller 180 may search a touch position of the second touch input 310, and search any one content located at the touch position.

When any one content item is searched, the controller 180 may display the searched content 554 in a different manner than the other content. For example, an edge of the searched content 554' may be displayed differently from the edge of the other content, or displayed such that the searched content 554 is continuously moved at a fixed position or blinks by controlling the brightness of the searched content 554.

Then, a touch of the second touch input 310 is released, and when a touch input 310' is sensed in the first region 600 of the second surface 410, the controller 180 may change the location of the searched content 554 to the first region 600. In other words, when the first touch input 210 of the first surface 420 is faced by a touch input of the second surface 410, the controller 180 may change the location of the searched content 554 to the first region 600.

Figure 18B:
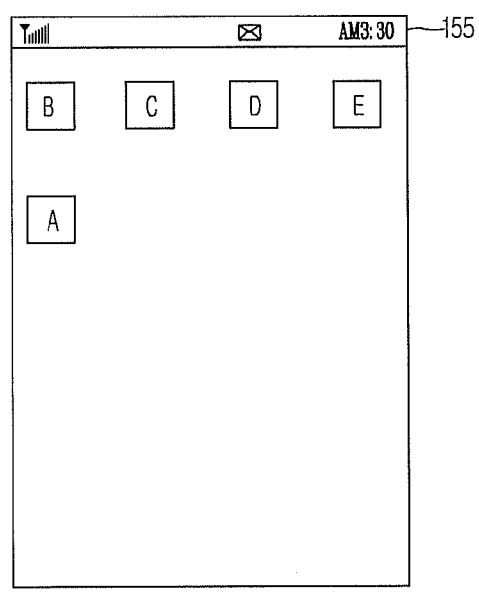
Figure 18C:
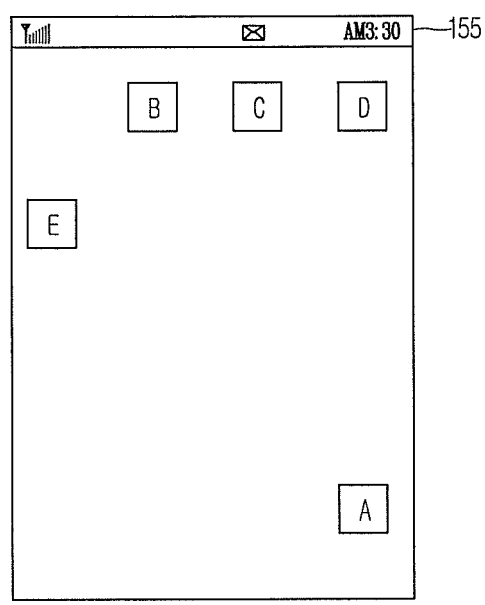

At this time, referring to FIG. 18B, when the arrangement mode of content is automatic arrangement or row arrangement, the controller 180 may move the searched content 554 to a location closest to the first region 600 while maintaining the row arrangement of content. The automatic arrangement or row arrangement may refer to an order for arranging icons on the background screen of a windows program. On the contrary to the above description with reference to FIG. 18B, referring to FIG. 18C, the controller 180 may change the location of the searched content 554 to the first region 600 without arranging the contents.

Figure 19A:
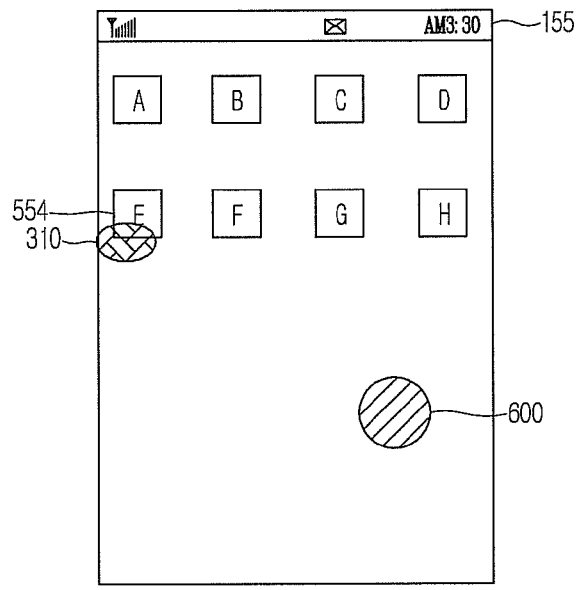

As described above with reference to FIG. 18A, referring to FIG. 19A, a plurality of content items may be displayed on the transparent display 155. Though a plurality of content items are displayed on the transparent display 155, there may be no content located in the first region 600. At this time, the controller 180 may search a touch position of the second touch input 310, and search any one content item located at the touch position in response to the second touch input 310.

On the contrary, when the second touch input 310 is not a drag input even though there is content located in the first region 600, the controller 180 may search a touch position of the second touch input 310, and search any one content item located at the touch position.

Figure 19B:
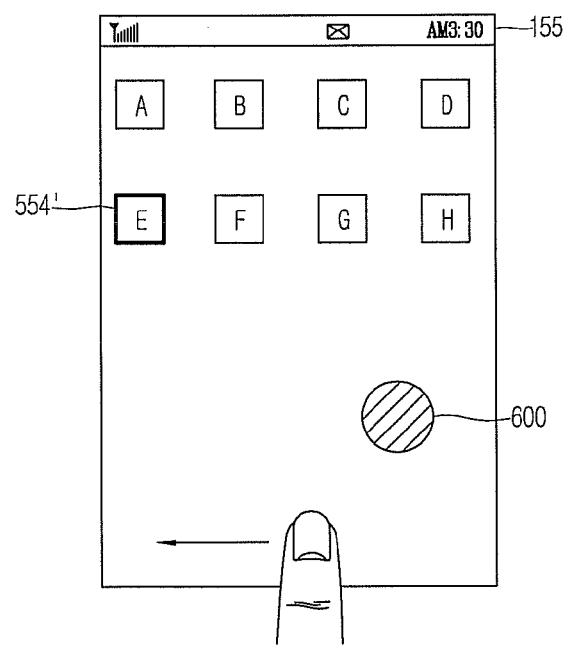

Referring to FIG. 19B, when any one content item located at the second touch position is searched in response to the second touch input 310, the controller 180 may display the searched content to be distinguished from the other contents (554→554'). For example, another color may be displayed at an edge of the searched content 554', the searched content 554' may be moved from the fixed position, or the transparency of the searched content 554' may be changed.

At this time, the user may apply a flicking input to the transparent display 155 to move the screen from a first page to a second page. For another example, the controller 180 may receive a page to be moved using the user input device 130, and display the received page on the transparent display 155.

Figure 19C:
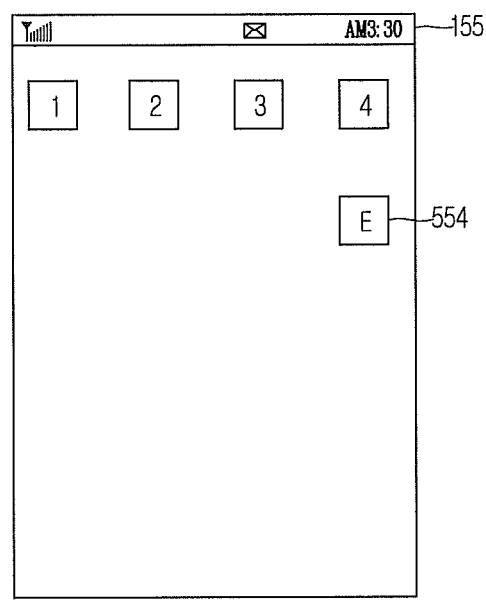

Referring to FIG. 19C, a second page is displayed by a flicking input in a state in which content is selected by the second touch input 310. The user may move the first touch input 210 of the first surface 420 to reconfigure the first region 600.

Figure 19D:
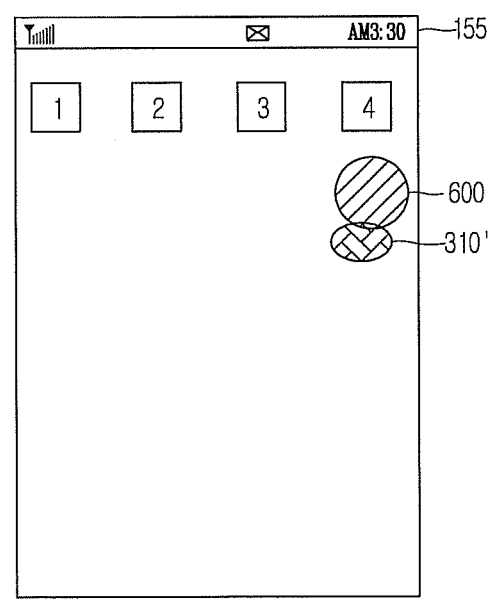

Referring to FIG. 19D, the user may reconfigure the first region 600 at a place to which the content 554 selected by the second touch input 310 is to be moved by drag-moving the first touch input 210, and apply the second touch input 310' to the first region 600 of the second surface 410. In this case, the controller 180 may place the content selected by the second touch input 310 in the first region 600. In other words, referring to FIGS. 19A through 19D, the controller 180 may move the content located on the first page to the second page (554→554'→554).

Figure 20:
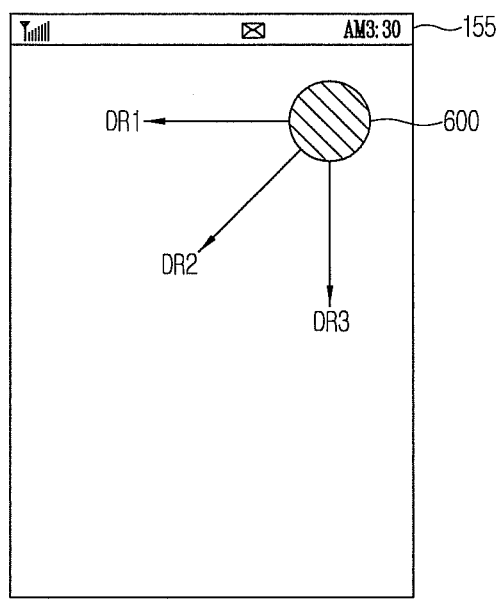
Figure 21:
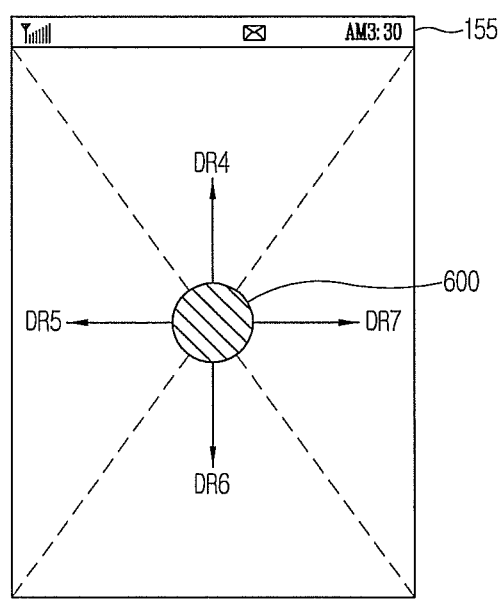

FIGS. 20 and 21 illustrate the drag direction of the second touch input 310 on the transparent display 155.

Referring to FIG. 20, the first region 600 may be formed at an upper right end of the transparent display 155, and second touch input 310 may be a drag input moving in any one of a westward direction (DR1), a south-westward direction (DR2), and a southward direction (DR3) relative to the first region 600. Any one of the plurality of control functions may be configured to correspond to each direction.

For example, a function of deleting the content, a function of enlarging the content, and a function of storing the content displayed on the transparent display 155 (a state in which at least one control function has been carried out based on the second touch input 130) may be configured to correspond to the westward direction (DR1), south-westward direction (DR2), and southward direction (DR3), respectively. In this case, when the second touch input 310 is moved in the westward direction (DR1) relative to the first region 600, the displayed content will be deleted.

Referring to FIG. 21, the first region 600 may be formed at the center of the transparent display 155. The transparent display 155 may be divided into two or more regions based on the first region 600. The controller 180 may perform different control functions based on whether the second touch input 310 is a drag input being moved into which one of the two or more regions from the first region 600.

For example, an application may be carried out by the first touch input 210 in a state that content containing audio data is output on the transparent display 155 or by audio output module 152. The controller 180 may increase volume when the drag direction of the second touch input 310 is a northward direction (DR4) from the first region 600, decrease volume when it is a southward direction (DR6), reproduce the previous file when it is a westward direction (DR5), and reproduce the next file when it is an eastward direction (DR7).

The foregoing control functions are merely exemplary embodiments of a mobile terminal. Various control functions other than the foregoing control functions may be carried out by the controller 180 according to the drag direction of the second touch input 310.

Figure 22:
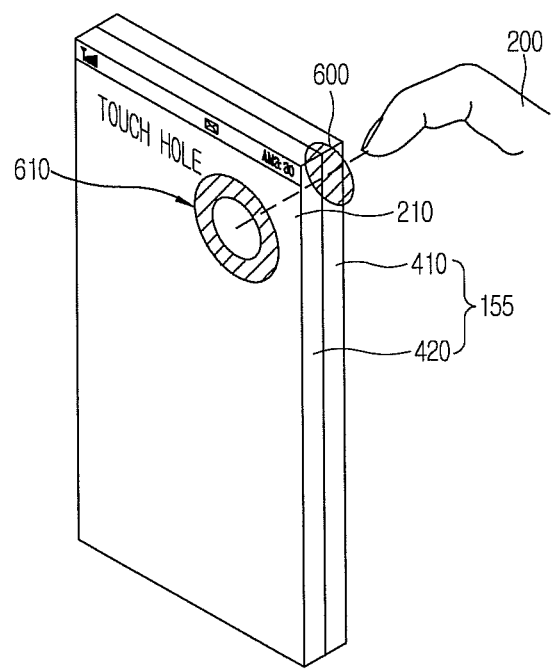
FIGS. 22 and 23A-23B illustrate a transparent display of a mobile terminal, according to an embodiment as broadly described herein.
Figure 23A:
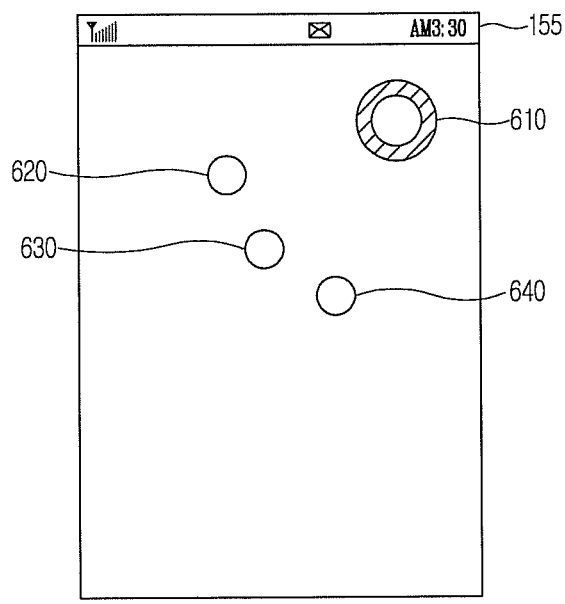
Figure 23B:
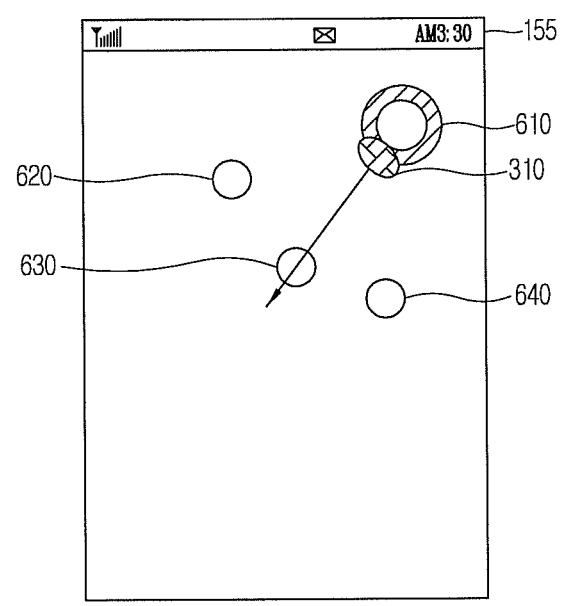

FIGS. 22 and 23A-23B illustrate the transparent display displaying an icon according to an embodiment as broadly described herein.

Referring to FIG. 22, when an application is carried out, the controller 180 may display an icon 610 at a location corresponding to the first region 600 on the transparent display 155. For example, the icon 610 may be a circular image the center of which is transparently perforated. The icon 610 may be referred to as a touch hole. The controller 180 may control the central region of the touch hole to be transparent. As a result, the user may visually confirm the first touch input 210.

Referring to FIG. 23A, the controller 180 may display a plurality of menus 620, 630, 640 to be separated from one another outside of the icon 610. The plurality of menus 620, 630, 640 may be respectively linked with control functions for content displayed on the transparent display 155. Referring to FIG. 23B, the second touch input 310 may be a drag input being moved from the icon 610 to any one of the plurality of menus 620, 630, 640. The controller 180 may implement a control function corresponding to any one of the plurality of menus 620, 630, 640.

The size and/or shape of the icon 610 may be changed according to the touch strength of the first touch input 210. For example, in a state in which the first region 600 is configured, the controller 180 may calculate a value corresponding to the touch strength of the first touch input 210. The controller 180 may compare a value corresponding to the touch strength with a data table stored in the memory 160, and configure the size of the icon 610 according to the comparison result. In other words, the size of the icon 610 may be increased as the touch pressure of the first touch input 210 applied thereto increases, and decreased as the touch pressure decreases. For another example, the size of the icon 610 may vary according to an area in which the first touch input 210 is brought into contact with the second surface 410.

In certain embodiments, at least one of the plurality of control functions may be carried out after a touch input is sensed on the icon 610. This may prevent at least one of the plurality of control functions from being unintentionally carried out.

The icon 610 has not been shown/described in the embodiments of FIGS. 7 through 21, but such an icon 610 may be displayed in the first region 600 with reference to FIGS. 22 and 23.

Figure 24A:
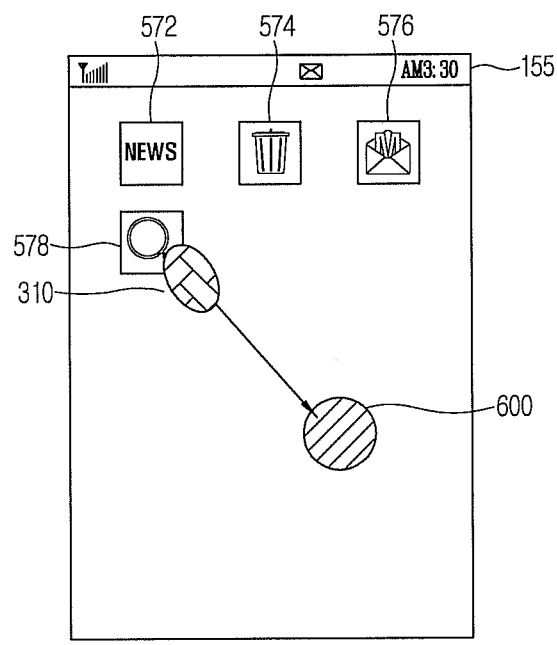
FIGS. 24A-24B illustrate a mobile terminal performing a delete, or trash function, according to an embodiment as broadly described herein.
Figure 24B:
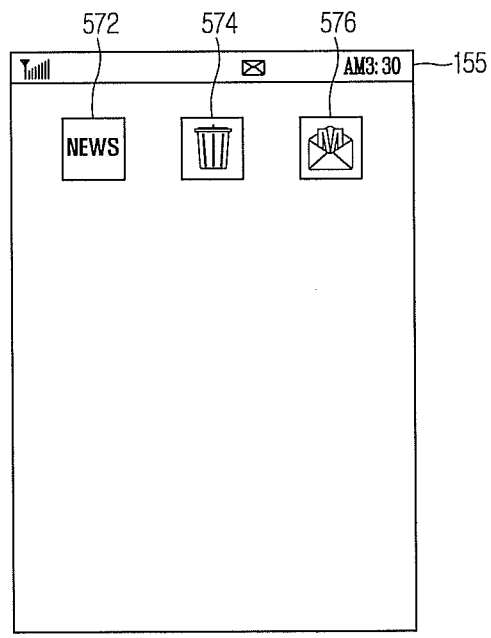

FIG. 24A-24B illustrate a mobile terminal performing a trash, or delete, or recycle, function. Referring to FIG. 24A, a plurality of content 572, 574, 578 may be displayed on the transparent display 155, and the first region 600 may be configured by the first touch input 210 of the first surface 420. The second touch input 310 of the second surface 410 may be a drag input for selecting at least one of the displayed plurality of content 572, 574, 578 and moving the selected content to the first region 600. Referring to FIG. 24B, the controller 180 may delete the content dragged to the first region 600. As a result, the first region 600 may perform the trash, or delete function.

FIGS. 25A-25B, 26A-26C and 27 illustrate a mobile terminal performing a control function according to an embodiment as broadly described herein.

Figure 25A:
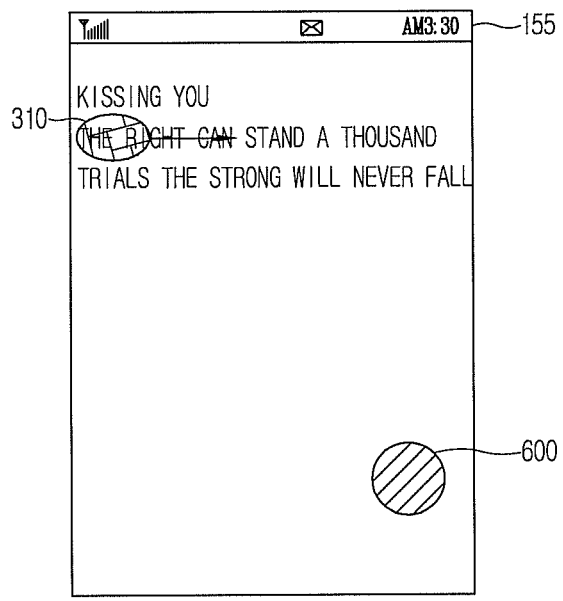
FIGS. 25A-25B, 26A-26C and 27 illustrate a mobile terminal performing a control function, according to an embodiment as broadly described herein.
Figure 25B:
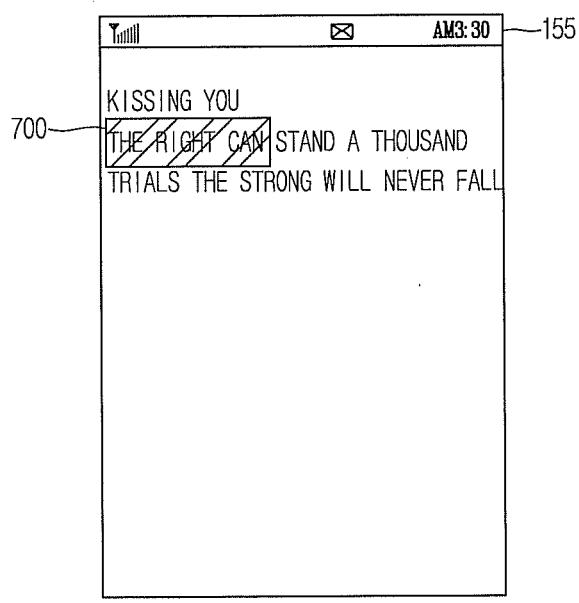

Referring to FIG. 25A, text data may be displayed as content on the transparent display 155. The text may be defined as a complex body of symbols. In the drawing, only text data is illustrated, but content further including at least one of an image and/or a video may be also displayed. In a state in which the application is carried out to configure the first region 600, the controller 180 may search a region corresponding to the touch position of the second touch input 310. Referring to FIG. 25B, the controller 180 may search a region in which the second touch input 310 is sensed from an initial touch position of the second touch input 310 to a final touch position thereof, and display the searched region 700 and the remaining region differently. For example, the illumination color of the searched region 700 or the remaining region may be different, thereby generating a highlighter effect. For another example, the luminance of the searched region 700 or the remaining region may be controlled, thereby displaying the two regions differently, or the searched region 700 may be completely transparent, thereby generating an effect appearing to erase the searched region 700. In addition, the controller 180 may capture data corresponding to the searched region 700 to temporarily or permanently store it in the memory 160. Accordingly, the user may capture only necessary data with a simple manipulation, and paste the captured data into another program.

Figure 26A:
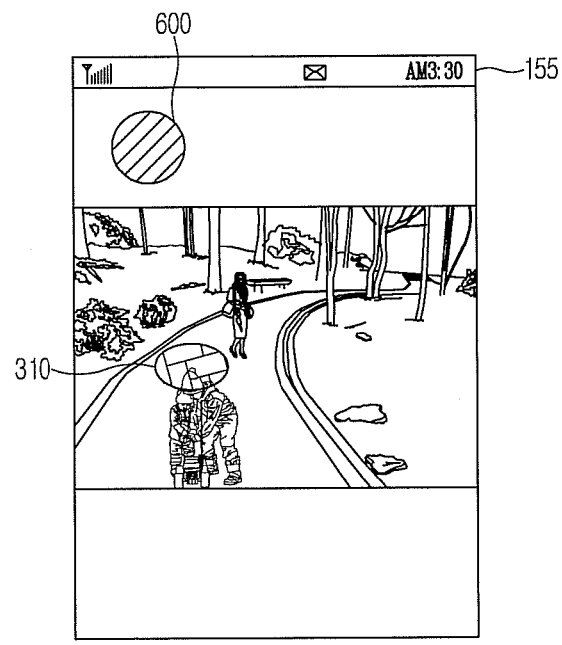
Figure 26B:
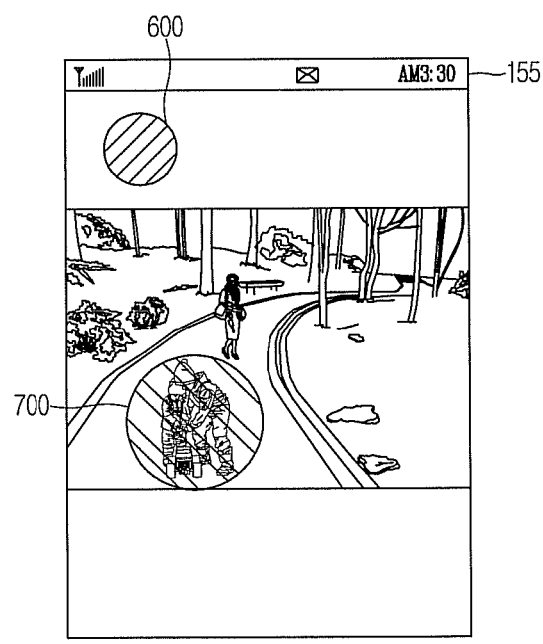
Figure 26C:
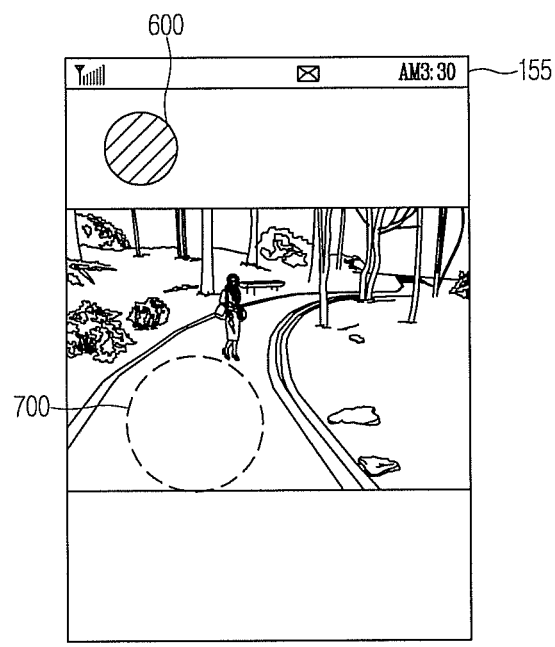

Referring to FIG. 26A, an image or video may be displayed on the transparent display 155. An application may be carried out to configure the first region 600, and the controller 180 may search a region corresponding to the touch position of the second touch input 310. Referring to FIG. 26B, the searched region 700 and the remaining region may be displayed differently. Furthermore, referring to FIG. 26C, the transparency of the searched region 700 may be controlled. The controller 180 may store content changed by the second touch input 310 in the memory 160.

Figure 27:
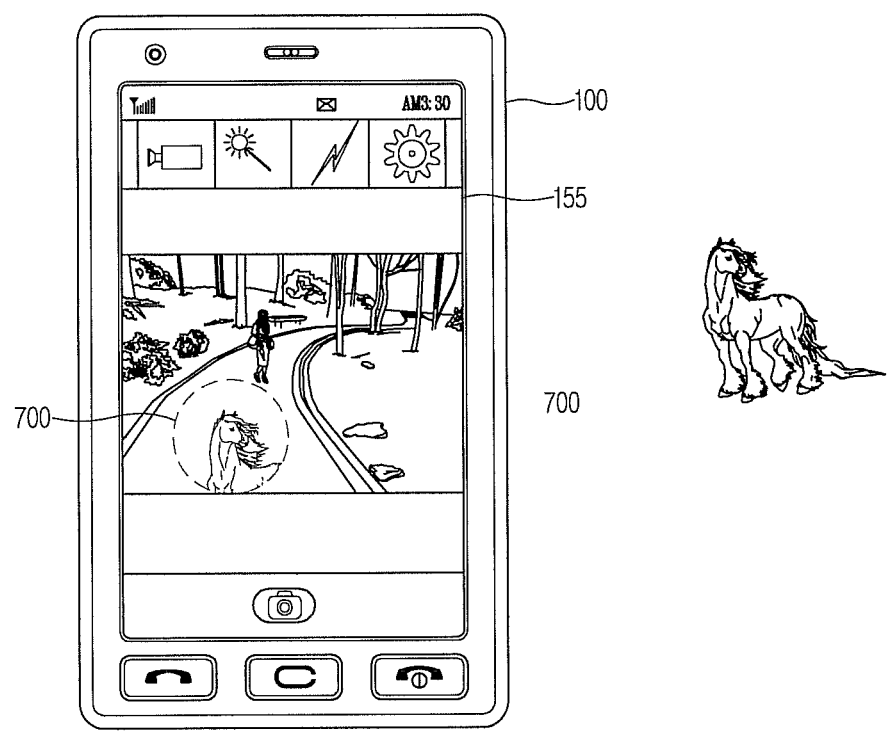

The changed content may be displayed on the transparent display 155, as shown in FIG. 27. In other words, the changed content may refer to content in which a partial region 710 is deleted by the second touch input 310 and displayed in a transparent manner. The user may capture a picture or video for the subject using the partial region 710 displayed in a transparent manner. As a result, an effect of combining two different images with each other may be generated.

Figure 28:
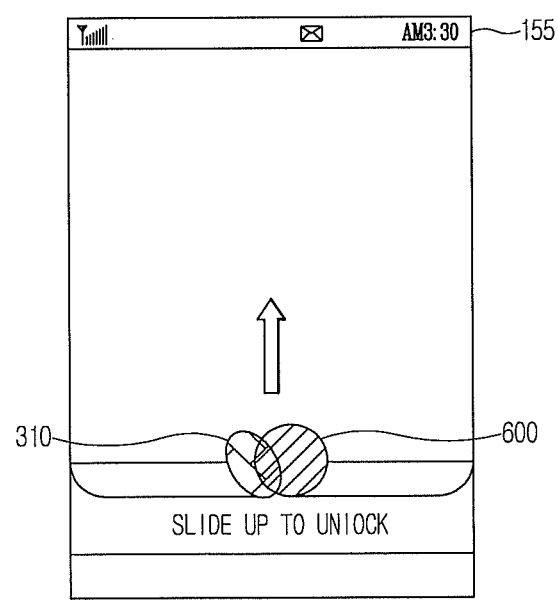
FIG. 28 illustrates a mobile terminal performing a lock release function, according to an embodiment as broadly described herein.

FIG. 28 illustrates a mobile terminal performing a lock release function. Referring to FIG. 28, a lock mode for restricting the use of the mobile terminal 100 may be set. The controller 180 may configure the first region 600 based on the first touch input 210 sensed on the second surface 410. When the second touch input 310 is a drag input initiated in the first region 600 and moved out of the first region 600, the controller 180 may release the locked state of the mobile terminal 100.

The controller 180 may release the locked state based on the location of the first region 600, the drag direction of the second touch input 310 and a fingerprint sensed by the first touch input 210. For example, referring to FIG. 28, when the drag direction of the second touch input 310 is a southward direction, and not a northward direction, the controller 180 may maintain the locked state. For another example, when a fingerprint stored in the controller 180 is not identical to a fingerprint sensed by the first touch input 210, the controller 180 may maintain the locked state. The location of the first region 600, the drag direction of the second touch input 310 and a fingerprint sensed by the first touch input may be reconfigured by the user.

As described above, a mobile terminal as embodied and broadly described herein may include the transparent display 155, and may control content based on a touch input sensed on a first surface and a second surface thereof, and thus various control functions may be carried out with a simple manipulation. In particular, a user may enter a touch input corresponding to a multi-touch input in a state in which the mobile terminal is held by one hand, without using the other hand. Accordingly, it may be possible to enhance user convenience.

Furthermore, a control function may be carried out by a first and second touch input, and thus the user may control content in a simple manner without using a menu or the like. Accordingly, it may be possible to facilitate various processes.

In addition, when an application is carried out in response to a first touch input, transparency of the transparent display may be controlled based on the first and second touch input, thereby providing for a visual check of a touch position of the touch input.

A mobile terminal and a control method thereof are provided which may allow a user to hold a body of the terminal using his or her one hand and to perform a multi-touch input using the one hand holding the body.

A mobile terminal and a control method thereof are provided, including a transparent display unit capable of performing a touch input on two different surfaces thereof.

A mobile terminal as embodied and broadly described herein may include a transparent display unit having a first surface and a second surface configured to display content and sense a touch input, a memory configured to store an application having a plurality of control functions for controlling the content, and a controller configured to implement the application in response to a first touch input onto the first surface and terminate the application when a touch of the first touch input is released, and perform at least one of the plurality of control functions based on a second touch input onto the second surface during the implementation of the application.

In certain embodiments, the controller may configure a first region containing a touch position of the first touch input on the transparent display unit when the application is carried out. Furthermore, the second touch input may be a drag input, and controller may perform at least one of the plurality of control functions based on the drag direction of the second touch input. The controller may enlarge or reduce the content according to whether the drag direction is further away from the first region or closer to the first region. At this time, the controller may enlarge or reduce the content around the first region.

In certain embodiments, the controller may rotate the content according to whether the drag direction is rotated around the first region.

In certain embodiments, the controller may display a control menu related to the content on an outer region of the first region when a touch of the second touch input is released, and transmit the content for which at least one control function is carried out based on the second touch input to an external server corresponding to the control menu when a touch input is sensed on the control menu In certain embodiments, there may be a plurality of contents, and the controller may search any one content located in the first region among the plurality of contents and perform a function of enlarging or reducing a region displayed with the any one content based on the drag direction when the application is carried out.

In certain embodiments, the plurality of control functions may include at least one of deleting a file, transferring a file, storing a file, increasing volume, decreasing volume, playing the next file, and playing the previous file.

In certain embodiments, the controller may display an icon at a location corresponding to the first region on the transparent display unit. Furthermore, the controller may display a plurality of menus for the content to be separated from one another at an outer region of the icon. At this time, the second touch input may be an input for dragging the icon to any one of the plurality of menus.

In certain embodiments, at least one of the plurality of control functions may be carried out when a touch input onto the icon is sensed.

In certain embodiments, the controller may control the size of the icon based on a touch strength of the first touch input.

In certain embodiments, the controller may return it to a state prior to performing at least one of the plurality of control functions when a third touch input onto the first region is sensed.

In certain embodiments, the controller may control the transparency of the first region or the remaining region excluding the first region when the application is carried out.

In certain embodiments, the controller may reconfigure the first region based on the drag movement when the application is carried out and the drag movement of the first touch input is sensed.

In certain embodiments, there may be a plurality of contents, and the second touch input may be an input for selecting at least one of the plurality of contents and dragging the selected at least one to the first region, and at least one of the plurality of control functions may be a function for deleting the at least one dragged to the first region.

In certain embodiments, the second touch input may be a drag input, and the controller may search a region corresponding to a touch position of the second touch input on the transparent display unit when the application is carried out. Furthermore, the controller may display the searched region and the remaining region thereof in a distinguished manner as moving the drag input. The controller may display the searched region and the remaining region thereof in a distinguished manner using the transparency.

In certain embodiments, the controller may capture data corresponding to the searched area and store it in the memory for the content.

A control method of a mobile terminal, as embodied and broadly described herein, may include displaying content on a transparent display unit having a first surface and a second surface configured to sense a touch input, sensing a first touch input onto the first surface, implementing an application having a plurality of control functions for controlling the content in response to the first touch input, terminating the application according to whether or not a touch of the first touch input is released, sensing a second touch input onto the second surface in a state that the application is carried out, and implementing at least one of the plurality of control functions based on the second touch input.

The method may also include configuring a first region containing a touch position of the first touch input on the transparent display unit when the application is carried out, wherein said implementing at least one of the plurality of control functions is implementing at least one of functions for enlarging, reducing, and rotating the content based on the drag direction of the second touch input.

In certain embodiments, when there are a plurality of contents, said implementing at least one of the plurality of control functions may include searching any one content located in the first region among the plurality of contents, and implementing at least one of functions for enlarging and reducing a region displayed with the content based on the drag direction of the second touch input.

The method may also include displaying an icon at a location corresponding to the first region on the transparent display unit when the application is carried out.

In certain embodiments, the content may be restored to a state prior to the implementation of the application according to whether or not a third touch input is sensed in the first region when the application is carried out.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
   a transparent display to display an image, the transparent display having a first surface and a second surface opposite the first surface, the first and second surfaces each configured to receive a touch input; and
   a controller configured to:
      display a plurality of contents in different areas of the transparent display,
      select one content, from among the plurality of contents, based on a touch received on the first surface, and
      when a drag input is received on the second surface while the touch is being received on the first surface, adjust a size of an area in which the selected one content is displayed according to the drag input such that information displayed in the adjusted area is varied.

2. The mobile terminal of claim 1, wherein the size of the area increases when the drag input is moved away from the touch, and the size of the area decreases when the drag input is moved closer to the touch.

3. The mobile terminal of claim 2, wherein the adjusted size of the area is maintained even when the touch is released.

4. The mobile terminal of claim 3, wherein the controller is further configured to restore the adjusted size of the area to an original size when a first region where a first touch is provided on the first surface and a second region where a second touch on the second surface at least partially overlap in a direction perpendicular to the first and second surfaces of the transparent display.

5. The mobile terminal of claim 1, wherein the controller is further configured to display a plurality of menus related to the selected one content in response to release of the drag input.

6. A method for controlling a mobile terminal, the method comprising:
   displaying a plurality of contents in different areas of a transparent display, the transparent display having a first surface and a second surface opposite the first surface, the first and second surfaces each configured to receive a touch input;
   selecting one content, from among the plurality of contents, based on a touch received on the first surface; and
   when a drag input is received on the second surface while the touch is being received on the first surface, adjusting a size of an area in which the selected one content is displayed according to the drag input such that information displayed in the adjusted area is varied.

7. The method of claim 6, wherein the size of the area increases when the drag input is moved away from the touch, and the size of the area decreases when the drag input is moved closer to the touch.

8. The method of claim 7, wherein the adjusted size of the area is maintained even when the touch is released.

9. The method of claim 8, further comprising:
   sensing release of the touch and the drag input;
   receiving a first touch on the first surface and a second touch on the second surface; and
   restoring the adjusted size of the area to an original size when a first region where the first touch is provided on the first surface and a second region where the second touch on the second surface at least partially overlap in a direction perpendicular to the first and second surfaces of the transparent display.

10. The method of claim 6, further comprising:
    displaying a plurality of menus related to the selected one content in response to release of the drag input.

* * * * *